United States Patent
Wei

(10) Patent No.: US 9,839,878 B2
(45) Date of Patent: Dec. 12, 2017

(54) PROCESS AND DEVICE FOR DESULPHURIZATION AND DENITRATION OF FLUE GAS

(71) Applicants: Xionghui Wei, Beijing (CN); Meihua Zou, Beijing (CN)

(72) Inventor: Xionghui Wei, Beijing (CN)

(73) Assignees: Xionghui Wei, Beijing (CN); Meihua Zou, Beijing (CN)

( * ) Notice: Subject to any disclaimer, the term of this patent is extended or adjusted under 35 U.S.C. 154(b) by 0 days.

(21) Appl. No.: 15/314,632

(22) PCT Filed: Jun. 4, 2015

(86) PCT No.: PCT/CN2015/080761
§ 371 (c)(1),
(2) Date: Nov. 29, 2016

(87) PCT Pub. No.: WO2015/185000
PCT Pub. Date: Dec. 10, 2015

(65) Prior Publication Data
US 2017/0197180 A1 Jul. 13, 2017

(30) Foreign Application Priority Data
Jun. 5, 2014 (CN) .......................... 2014 1 0245417

(51) Int. Cl.
*B01D 53/56* (2006.01)
*B01D 53/60* (2006.01)
(Continued)

(52) U.S. Cl.
CPC ......... *B01D 53/96* (2013.01); *B01D 53/1425* (2013.01); *B01D 53/1456* (2013.01);
(Continued)

(58) Field of Classification Search
CPC ............ B01D 53/1456; B01D 53/1481; B01D 53/50; B01D 53/507; B01D 53/56;
(Continued)

(56) References Cited

U.S. PATENT DOCUMENTS

| 2009/0155889 | A1* | 6/2009 | Handagama | ....... B01D 53/1425 435/262.5 |
| 2016/0310888 | A1* | 10/2016 | Wei | ..................... B01D 53/1481 |
| 2017/0021304 | A1* | 1/2017 | Wei | ..................... B01D 53/1493 |

FOREIGN PATENT DOCUMENTS

| CN | 1780678 A | 5/2006 |
| CN | 101053746 A | 10/2007 |

(Continued)

*Primary Examiner* — Timothy C Vanoy
(74) *Attorney, Agent, or Firm* — Novick, Kim & Lee, PLLC; Allen Xue

(57) ABSTRACT

The invention discloses a process and device for desulfurization-denitration of a flue gas. A desulfurization-denitration solution is used in an absorption tower to absorb sulfur dioxide and/or nitrogen oxides from the flue gas or various combustion tail (waste) gases. The desulfurization-denitration solution with absorbed sulfur dioxide and/or nitrogen oxides releases the sulfur dioxide and/or nitrogen oxides by heating and/or gas stripping and/or vacuum regeneration in a regeneration tower. The released sulfur dioxide and/or nitrogen oxides are further concentrated into a sulfur dioxide and/or nitrogen oxide product with a higher purity in a concentration tower. The regenerated desulfurization-denitration solution is recycled for use. The process and device have a wide range of industrial applications, and can be used for desulfurization and/or denitration of flue gases, incineration gases, coke-oven gases, synthetic waste gases from dyestuff plants, pollutant gases discharged from chemical fiber plants and other industrial raw material gases or waste gases containing SOx.

10 Claims, 3 Drawing Sheets

(51) Int. Cl.
*B01D 53/74* (2006.01)
*B01D 53/77* (2006.01)
*B01D 53/78* (2006.01)
*B01D 53/96* (2006.01)
*B01D 53/14* (2006.01)
*B01D 53/18* (2006.01)
*C01B 21/20* (2006.01)
*C01B 17/60* (2006.01)

(52) U.S. Cl.
CPC ..... *B01D 53/1481* (2013.01); *B01D 53/1493* (2013.01); *B01D 53/18* (2013.01); *B01D 53/60* (2013.01); *B01D 53/78* (2013.01); *C01B 17/60* (2013.01); *C01B 21/20* (2013.01); *B01D 2252/202* (2013.01); *B01D 2257/302* (2013.01); *B01D 2257/404* (2013.01); *C01B 2210/0007* (2013.01)

(58) Field of Classification Search
CPC ........ B01D 53/60; B01D 53/74; B01D 53/77; B01D 53/78; B01D 2251/70; B01D 2251/80; B01D 2252/2026; B01D 2252/2028; B01D 2257/302; B01D 2257/402; B01D 2257/404; B01D 2258/0283

See application file for complete search history.

(56) References Cited

FOREIGN PATENT DOCUMENTS

| | | |
|---|---|---|
| CN | 101185838 A | 5/2008 |
| CN | 101502741 A | 8/2009 |
| CN | 101896247 A | 11/2010 |
| CN | 102343201 A | 2/2012 |
| CN | 103432890 A | 12/2013 |
| CN | 103495340 B | 11/2015 |
| CN | 103611391 B | 1/2016 |
| CN | 103623689 B | 6/2016 |

* cited by examiner

PROCESS AND DEVICE FOR DESULPHURIZATION AND DENITRATION OF FLUE GAS

TECHNICAL FIELD

The present invention relates to the industrial field of gas desulfurization-denitration, and specifically to a process and device for desulfurization-denitration of a flue gas or various combustion tail (waste) gases.

BACKGROUND ART

Fossil fuel combustion produces a large amount of flue gases discharged into atmosphere, which, in addition to sulfur dioxide, sulfur trioxide, hydrogen chloride, hydrogen fluoride, nitrogen oxides and a small amount of harmful organic substances, contain a large amount of dusts, there are tiny hydrophilic and non-hydrophilic particles in these dusts (mainly calcium salt particles, aluminum salt particles, magnesium salt particles, titanium salt particles, iron salt particles, lead salt particles, zinc salt particles, cobalt salt particles, rare earth element particles, radioactive element particles and particles of other harmful elements, as well as mineral particles such as silica particles, mullite particles, silicate particles, and phosphate particles). These particles are discharged together with the flue gases into atmosphere. At the same time, sulfur dioxide, sulfur trioxide, hydrogen chloride, hydrogen fluoride, nitrogen oxides, harmful organic substances, bacteria, and the like are readily adsorbed on the surface of these particles, thus the content of atmospheric suspended particles (which are generally referred to as PM100, PM10, PM2.5, etc.) is increased significantly, resulting in the phenomenons of haze and atmospheric photochemical reactions, and causing serious environmental pollution.

At present, desulfurization process and denitration process are independent of each other. Typically denitration is followed by desulfurization.

The existing desulfurization process mainly contains desulfurization process of hearth calcium-injection combustion method, dry desulfurization process and wet desulfurization process for flue gases, industrial raw material gases and other waste gases containing sulfur, and so on.

The desulfurization process of hearth calcium-injection combustion method is a process of desulfurization during combustion, wherein an oxide or carbonate or the like containing element of calcium or magnesium is injected directly into the hearth of a boiler for sulfur fixation, or the oxide or carbonate or the like containing element of calcium or magnesium is uniformly mixed directly with a coal and fed into the hearth to combust for sulfur fixation. Such oxide or carbonate containing element of calcium or magnesium reacts at a high temperature with sulfur dioxide or sulfur trioxide generated by combustion to produce calcium sulfate or magnesium sulfate, and calcium sulfite or magnesium sulfite is also produced at the same time. Such sulfite is partially oxidized by the oxygen in the flue gas into calcium sulfate or magnesium sulfate, thus part of the sulfur is fixed in the combustion ashes, and desulfurization function is achieved. However, the desulfurization efficiency is not high, usually less than 80%, and the ratio of Ca/S (Mg/S) is far greater than 1.5, which means a large resource consumption of oxide or carbonate containing element of calcium or magnesium.

In the dry desulfurization process, a flue gas passes through a dry desulfurizer before being vented, and is vented after being desulfurized. The dry desulfurizer is loaded with a solid particulate dry desulfurizing agent, which is usually iron oxide, zinc oxide, manganese oxide, cobalt oxide, chromium oxide, molybdenum oxide, and the like. Such dry desulfurizing agent absorbs the sulfur dioxide in the flue gas and then generates corresponding sulfite. When such oxide loses its ability to absorb sulfur dioxide, it has to be replaced by a new dry desulfurizing agent. Dry desulfurizing agent is consumed in a great amount and is expensive, and a lot of waste residues are produced at the same time, which need to be piled up and landfilled, resulting in serious pollution transfer and secondary pollution phenomenon.

For the wet desulfurization process, there are specifically limestone wet desulfurization process, lime wet desulfurization process, ammonia desulfurization process, dual alkali desulfurization process, ammonium phosphate fertilizer desulfurization process, wet magnesium desulfurization process, seawater desulfurization process, Wellman-Lord desulfurization process, sodium (or potassium) sulfite desulfurization process, organic acid-organic acid salt buffer solution desulfurization process, and so on.

In the limestone wet desulfurization process, calcium carbonate stones from mines are broken by a crusher, ground into fine powders of greater than 325 mesh by a ball mill, and then formulated into a slurry containing 10%-15% calcium carbonate powder. In a desulfurization tower, the calcium carbonate slurry contacts with the flue gas in a counter-current way (or in a co-current way, or in a mixed way of counter-current and co-current), and sulfur dioxide in the gas reacts with calcium carbonate in the slurry to produce calcium sulfite, thus the calcium carbonate slurry is converted into a calcium sulfite slurry. In the air forced oxidation layer of the desulfurization tower, the calcium sulfite slurry is oxidized into calcium sulfate, thus the calcium sulfite slurry is converted into a calcium sulfate slurry. The calcium sulfate slurry flows out of the desulfurization tower and enters into a separator to separate calcium sulfate from the slurry. Water separated out is returned for recycle use to prepare calcium carbonate slurry. Calcium sulfate separated out is either landfilled as a waste residue or is used for roadbed repairing, or it can be purified and used for manufacturing plasterboards. However, this process generates a lot of solids of calcium sulfate, as well as some solid wastes such as calcium sulfite and unreacted calcium carbonate. With large limestone consumption, huge devices of crushing and milling, and high power consumption, the investment is great. Moreover, solid precipitates, which tend to clog the devices, are produced during the absorption process. Sewage discharge is large, and secondary pollution is serious. Also, tiny hydrophilic and non-hydrophilic particles contained in the calcium carbonate slurry (mainly calcium salt particles, aluminum salt particles, magnesium salt particles, titanium salt particles, iron salt particles, lead salt particles, zinc salt particles, cobalt salt particles, rare earth element particles, radioactive element particles and particles of other harmful elements, as well as mineral particles such as silica particles, mullite particles, silicate particles, and phosphate particles and the like) are carried out by the flue gas, and discharged into atmosphere, while sulfur dioxide, sulfur trioxide, hydrogen chloride, hydrogen fluoride, nitrogen oxides, harmful organic substances, bacteria, and the like are readily adsorbed on the surface of these particles, thus the content of atmospheric suspended particles (which are generally referred to as PM100, PM10, PM2.5, etc.) is increased significantly, resulting in the phenomenons of haze and atmospheric photochemical reactions, and causing serious environmental pollution.

In the lime wet desulfurization process, a calcined calcium oxide is utilized to react with water, producing an aqueous emulsion of calcium hydroxide, which is formulated into a slurry containing 10% to 15% calcium hydroxide. In a desulfurization tower, the calcium hydroxide slurry contacts with the flue gas in a counter-current way (or in a co-current way, or in a mixed way of counter-current and co-current), and sulfur dioxide in the gas reacts with calcium hydroxide in the slurry to produce calcium sulfite, thus the calcium hydroxide slurry is converted into a calcium sulfite slurry. In the air forced oxidation layer of the desulfurization tower, the calcium sulfite slurry is oxidized into calcium sulfate, thus the calcium sulfite slurry is converted into a calcium sulfate slurry. The calcium sulfate slurry flows out of the desulfurization tower and enters into a separator to separate calcium sulfate from the slurry. Water separated out is returned for recycle use to prepare calcium hydroxide slurry. Calcium sulfate separated out is either landfilled as a waste residue or is used for roadbed repairing, or it can be purified and used for manufacturing plasterboards. However, this process generates a lot of solids of calcium sulfate, as well as solid wastes such as calcium sulfite, calcium carbonate, and unreacted calcium hydroxide. With large lime consumption and huge devices, the investment is great. Moreover, solid precipitates, which tend to clog the devices, are produced during absorption. Sewage discharge is large, and secondary pollution is serious. Besides, a large amount of coals is consumed in the calcination process for the production of calcium oxide, which also cause serious pollution. Meanwhile, tiny hydrophilic and non-hydrophilic particles contained in the calcium hydroxide slurry (mainly calcium salt particles, aluminum salt particles, magnesium salt particles, titanium salt particles, iron salt particles, lead salt particles, zinc salt particles, cobalt salt particles, rare earth element particles, radioactive element particles and particles of other harmful elements, as well as mineral particles such as silica particles, mullite particles, silicate particles, and phosphate particles and the like) are carried out by the flue gas, and discharged into atmosphere, while sulfur dioxide, sulfur trioxide, hydrogen chloride, hydrogen fluoride, nitrogen oxides, harmful organic substances, bacteria, and the like are readily adsorbed on the surface of these particles, thus the content of atmospheric suspended particles (which are generally referred to as PM100, PM10, PM2.5, etc.) is increased significantly, resulting in the phenomenons of haze and atmospheric photochemical reactions, and causing serious environmental pollution.

In the ammonia desulfurization process, an aqueous ammonia with a certain concentration is used as an absorbent to absorb the sulfur dioxide in the flue gas, ammonium bisulfite is generated from the reaction, which is converted into ammonium bisulfate by forced oxidation. The ammonium bisulfate is finally basified into ammonium sulfate by ammonia, and the ammonium sulfate is separated as a fertilizer byproduct. The process is as follows: in the desulfurization tower, the flue gas after dedusting and heat-exchanging via gas-gas heat exchanger contacts with aqueous ammonia in a counter-current way or in a co-current way or in a mixed way of counter-current and co-current, sulfur dioxide in the flue gas is absorbed by aqueous ammonia and converted into ammonium bisulfite. The flue gas after desulfurization is subjected to heat-exchanging via gas-gas heat exchanger, and then discharged through a chimney into atmosphere. The ammonium bisulfite solution produced after desulfurization goes through a forced oxidation section or a separate forced oxidizer in the desulfurization tower, and is oxidized by air or ozone, after that it is converted into ammonium bisulfate, and then enters into a basified device, in which it is basified by ammonia gas or concentrated aqueous ammonia and converted into ammonium sulfate, which is crystallized by a crystallizer, separated and dried to obtain an ammonium sulfate fertilizer by-product. Aqueous ammonia mother liquor separated out is continuously fed with ammonia to increase the concentration of ammonia for recycle use. Ammonia desulfurization process has a high desulfurization efficiency, and the solution circulating volume is small. However, ammonia has high toxicity, very strong volatility and low boiling point, thus phenomenon of ammonia entrained in the flue gas is serious, resulting in heavy loss of ammonia and secondary pollution caused by atmospheric ammonia. At the same time, the consumption of ammonia in the ammonia desulfurization process is very large, and ammonia is converted into low-valued ammonium sulfate, thus the cost of desulfurization is high, and crystallization is likely to occur, clogging devices and pipelines. Moreover, ammonia is highly corrosive, thus the device corrosion is serious, and ammonia production process is one of high energy consumption and high pollution, excessive consumption of ammonia is actually a process of worsening environmental pollution and increasing energy consumption indirectly, therefore the use of ammonia should be minimized.

For the dual alkali desulfurization process, in a desulfurization tower, aqueous solutions of alkaline metal salts which are highly water-soluble, such as NaOH, $Na_2CO_3$, $Na_2SO_3$, or the like are used to absorb sulfur dioxide in the flue gas, water-soluble sodium bisulfite or bisulfite of alkaline metal is produced by the reaction. The purified flue gas is discharged through a chimney into atmosphere. The aqueous solution of sodium bisulfite or bisulfite of alkaline metal is fed to lime reactor for neutralization reaction with CaO or $CaCO_3$, during which oxidization with air is carried out simultaneously to produce calcium sulfate precipitates, which are separated to obtain plaster. The solution in turn is converted into the aqueous solution of alkaline metal salt which is highly water-soluble, such as NaOH, $Na_2CO_3$, or the like, for repeated use. The purpose of dual alkali desulfurization process is to avoid the problem of precipitate clogging in pure limestone (or lime) process, however, it is substantially a process that uses limestone (or lime) as a desulfurizing agent.

In the ammonium phosphate fertilizer desulfurization process (PAFP), natural phosphorite ore and ammonia are utilized as raw materials, and an ammonium phosphate compound fertilizer is directly produced during the flue gas desulfurization process. The process mainly consists of unit operations such as adsorption, extraction, neutralization, absorption, oxidation, concentration and desiccation. In adsorption, activated carbon is used as a first-stage desulfurization adsorption medium to conduct adsorption treatment to $SO_2$ in the flue gas. In the presence of oxygen, $SO_2$ is catalytically oxidized into $SL_3$. When the adsorption capacity of activated carbon is close to saturation, a dilute sulfuric acid, with a concentration greater than 30%, is obtained by washing and regenerating the activated carbon. The regenerated activated carbon is used repeatedly; In preparing phosphoric acid by extraction of phosphorite ore, the dilute sulfuric acid prepared by the first-stage desulfurization is reacted with phosphorite ore ($Ca_{10}(PO_4)F_2$) powders, generating hydrogen fluoride, phosphoric acid and calcium sulfate. Phosphoric acid can be obtained after extraction and filtration, with a phosphorite ore extraction rate greater than 90%, and a concentration of dilute phosphoric acid greater than 10-14%; In neutralization, ammonia is reacted with phosphoric acid obtained by extraction to produce diammonium hydrogen phosphate, which is used as a second-stage desulfurizing agent. In a second-stage desulfurization tower, diammonium hydrogen phosphate absorbs $SO_2$ to produce diammonium hydrogen sulfite and ammonium dihydrogen phosphate; In oxidation, diammonium hydrogen sulfite in the solution is oxidized to ammonium sulfate, and the oxidized solution is subjected to concentration and desiccation to produce a compound fertilizer of solid ammonium dihydrogen phosphate and ammonium sulfate. The process is very complex, with a large investment, a large steam consumption and a high energy consumption. At the same time, a large amount of natural phosphorite ore consumption is required. Therefore, the technology and process are not applicable anywhere, they can only be used where natural phosphorite ores are available.

For wet magnesium desulfurization process, in a desulfurization tower, a slurry of magnesium oxide or magnesium hydroxide contacts with the flue gas in a counter-current way (or in a co-current way, or in a mixed way of counter-current and co-current), and sulfur dioxide in the gas reacts with magnesium oxide or magnesium hydroxide in the slurry to produce magnesium sulfite, thus the magnesium oxide or magnesium hydroxide slurry is converted into a magnesium sulfite slurry. The magnesium sulfite slurry is subjected to precipitation and enters into a separator to separate magnesium sulfite from the slurry. Water separated out is returned for recycle use to prepare magnesium oxide or magnesium hydroxide slurry. Magnesium sulfite separated out is calcined at a temperature above 1235K to produce magnesium oxide and sulfur dioxide gas. Magnesium oxide produced is used repeatedly, and sulfur dioxide can be recycled. However, the magnesium sulfite solids produced in the process tend to clog the pipelines and devices, and also, magnesium sulfite does not decompose until it is calcined at a temperature above 1235K, thus energy consumption is high, investment is large, and secondary pollution is serious. Meanwhile, tiny hydrophilic and non-hydrophilic particles contained in the magnesium oxide or magnesium hydroxide slurry (mainly calcium salt particles, aluminum salt particles, magnesium salt particles, titanium salt particles, iron salt particles, lead salt particles, zinc salt particles, cobalt salt particles, rare earth element particles, radioactive element particles and particles of other harmful elements, as well as mineral particles such as silica particles, mullite particles, silicate particles, and phosphate particles and the like) are carried out by the flue gas, and discharged into atmosphere, while sulfur dioxide, sulfur trioxide, hydrogen chloride, hydrogen fluoride, nitrogen oxides, harmful organic substances, bacteria, and the like are readily adsorbed on the surface of these particles, thus the content of atmospheric suspended particles (which are generally referred to as PM100, PM10, PM2.5, etc.) is increased significantly, resulting in the phenomenons of haze and atmospheric photochemical reactions, and causing serious environmental pollution.

In seawater desulfurization process, use is made of a large amount of salts of calcium, magnesium, aluminum, sodium, potassium and other ions, especially carbonates, which have a high alkalinity. Such a method of directly absorbing sulfur dioxide in the flue gas with seawater is the seawater desulfurization process, and the process is very simple. In a desulfurization tower, seawater is in direct contact with the flue gas, and absorbs sulfur dioxide in the flue gas. Seawater alkaline substances (especially carbonates; sometimes calcium oxide or calcium hydroxide is added to the seawater artificially in order to increase the alkalinity thereof) react with sulfur dioxide to produce sulfites. Seawater with sulfur dioxide absorbed in it is subjected to sun exposure and oxidation, wherein the sulfites is oxidized into sulfates, and then discharged directly into the sea. The technology and process can only be applied at seaside, because the seawater consumption is particularly large. Due to the large amount of sulfate discharging to the sea, seawater environment is more or less damaged.

The sodium (or potassium) sulfite desulfurization process is similar to the wet magnesium desulfurization process, wherein in a desulfurization tower, an aqueous solution of sodium (or potassium) sulfite contacts with the flue gas in a counter-current way (or in a co-current way, or in a mixed way of counter-current and co-current), and sulfur dioxide in the gas reacts with sodium (or potassium) sulfite in the solution to produce sodium (or potassium) bisulfite, thus the sodium (or potassium) sulfite solution is converted into sodium (or potassium) bisulfite solution. The sodium (or potassium) bisulfite solution enters into a steam heating regenerator for regeneration, and the sodium (or potassium) bisulfite solution is converted into an aqueous solution of sodium (or potassium) sulfite, and sulfur dioxide is released at the same time. The aqueous solution of sodium (or potassium) sulfite is recycled for use, and sulfur dioxide gas can be recovered as a by-product. The process is good in terms of conception, however, practical tests show that the regeneration rate of sodium (or potassium) bisulfite solution during steam heating is very low, only a very small part of sodium (or potassium) bisulfite can be converted into sodium (or potassium) sulfite, most of sodium (or potassium) bisulfite cannot be decomposed, and steam consumption is large. Therefore, the process has been unable to be industrialized.

Wellman-Lord desulfurization process is actually an improved sodium sulfite circulation process, but with a multi-effect evaporation procedure added thereto, for the evaporation of desulfurization solution and crystallization of sodium sulfite. There are large-scale application examples of this method in the United States, Germany, France and Japan, but its steam consumption is large, and energy consumption is high.

In the organic acid-organic acid salt buffer solution desulfurization process, a buffer solution comprised of organic acid and organic acid salt is used as a desulfurization solution. In a desulfurization tower, the desulfurization solution contacts with the flue gas in a counter-current way (or in a co-current way, or in a mixed way of counter-current and co-current), and sulfur dioxide in the gas reacts with organic acid salt in the solution to produce bisulfite and organic acid. The solution enters into a steam heating regenerator for regeneration, sulfite in the solution is converted into organic acid salt, and the solution is still converted into the organic acid-organic acid salt buffer solution for repeated use. At the same time, sulfur dioxide is released, and the sulfur dioxide gas can be recovered as a by-product. The process is good in terms of conception, however, practical tests show that the regeneration rate of sulfite in the organic acid-organic acid salt buffer solution during steam heating is very low, only a very small part of sulfite can be converted into organic acid salt, most of sulfite cannot be decomposed, and steam consumption is large. Therefore, the process has been unable to be industrialized. On the basis of this process, a suggestion is that calcium oxide (or calcium hydroxide) is added to the organic acid-organic acid salt buffer solution, such that unregenerated sodium sulfite is converted into calcium sulfite, precipitated and separated, thus the solution is completely regenerated. The regenerated organic acid-organic acid salt buffer solution is recycled for use, but the actual desulfurizing agent is still calcium oxide (or calcium hydroxide). As the solution contains some calcium ions, precipitation may occur during desulfurization, clogging pipelines and devices.

At present, the denitration process used in actual production is catalytic ammonia denitration process. In the catalytic ammonia denitration process, ammonia is directly injected into the flue gas at a temperature of about 150° C.-500° C. and under a condition of a catalyst. Within the catalyst layer, ammonia gas reacts with $NO_X$ to produce $N_2$ and $H_2O$, thus eliminating $NO_X$. The process consumes a large amount of ammonia, and as the flue gas contains about 4%-9% $O_2$, the reaction of ammonia gas with $O_2$ will produce $NO_X$ with consumption of ammonia, and reaction of ammonia is not complete, some ammonia is discharged into atmosphere with the flue gas, increasing the loss of ammonia, and causing secondary pollution. A large amount of fossil fuels are consumed during ammonia production, generating a large amount of waste gas, waste residue, and waste water. It is a process with serious environmental pollution, thus the use of ammonia should be minimized.

SUMMARY OF THE INVENTION

We have developed patent technologies, such as "Method for removing SOx from gas using polyethylene glycol" (Patent No. ZL 200910009058.1), "Method for removing SOx from flue gas using ethylene glycol" (Patent No. ZL200710110446.X), "Method for removing SOx from gas using modified polyethylene glycol" (Application No. 201310409296.8), "Method for removing SOx from gas using composite alcohol amine solution" (Application No. 201310481557.7), "Method for removing SOx from gas using ethylene glycol composite solution" (Application No. 201310682799.2), "Method for removing SOx from gas using polyol composite solution" (Application No. 201310682382.6), and the like. In order to better achieve the large-scale industrial applications of the above technologies, we have invented a process and a device for flue gas desulfurization-denitration, which are adapted to these patent technologies (hereinafter referred to as "our patent technologies").

In the present invention, the desulfurization-denitration solution used in the flue gas desulfurization-denitration process and device is a composite solution containing polyol (and/or containing polymeric polyol). The compositions, contents and characteristics of these desulfurization-denitration solutions have been described in our patent technologies, and will not be repeated here. In order for the desulfurization-denitration solution to have strong abilities of sulfur absorption, denitration, and desorption, suitable additives can be added to the desulfurization-denitration solution containing polyol (and/or containing polymeric polyol). The kinds, compositions, contents and characteristics of the additives added to the desulfurization-denitration solution have also been described in our patent technologies, and will not be repeated here.

The flue gas desulfurization-denitration process and device of the present invention are capable of achieving desulfurization and denitration simultaneously. The principle of desulfurization has been described in our patent technologies, and will not be repeated here. Only the principle of denitration will be described herein as follows:

Denitration is mainly the removal of nitrogen oxides $NO_X$ from flue gas (x represents the number of oxygen atoms) (nitrogen oxides include $NO_2$, NO, $N_2O$, etc., more than 90% of flue gas is NO). The desulfurization-denitration solution is composed of EG (ethylene glycol) and/or PEG (polyethylene glycol), water, polycarboxylic acid and/or polycarboxylic acid salt, and additive.

In order to describe the fundamental principles of the present invention more clearly, the esterification mechanism and denitration mechanism of the desulfurization-denitration solution of the present invention will be explained by taking ethylene glycol, citric acid and its salts, and sulfone group-containing substances as examples only. However, the desulfurization-denitration solution of the present invention is not limited to be composed only of ethylene glycol, citric acid and its salts, and sulfone and/or sulfoxide group-containing substances. Rather, it is a desulfurization-denitration solution composed of ethylene glycol and/or polyethylene glycol, organic acid and/or organic acid salts, and additives (examples have been listed in our patent technologies, and will not be listed here).

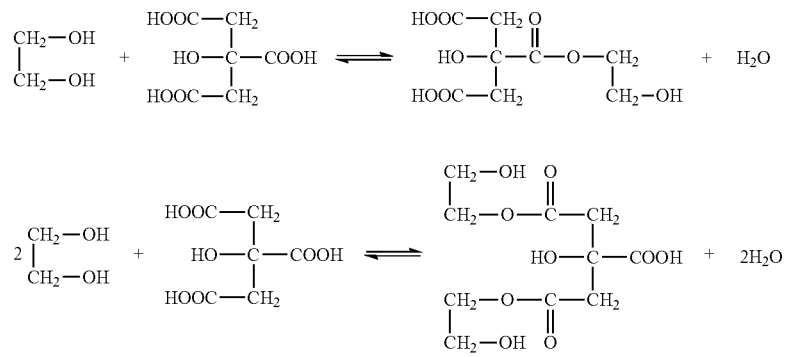

The formula

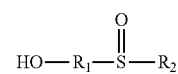

represents a sulfoxide group-containing substance. Such a substance interacts with carboxylic acids containing lipids in the following manner:

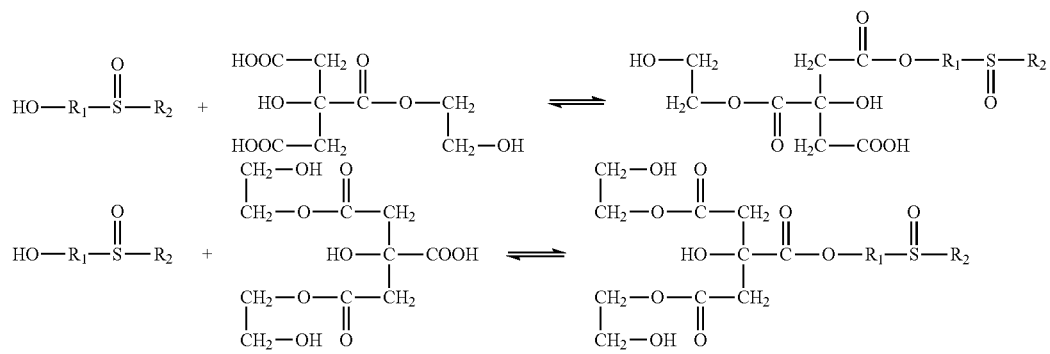

When the desulfurization-denitration solution contacts with the flue gas in an absorption tower, the following denitration reactions occur:

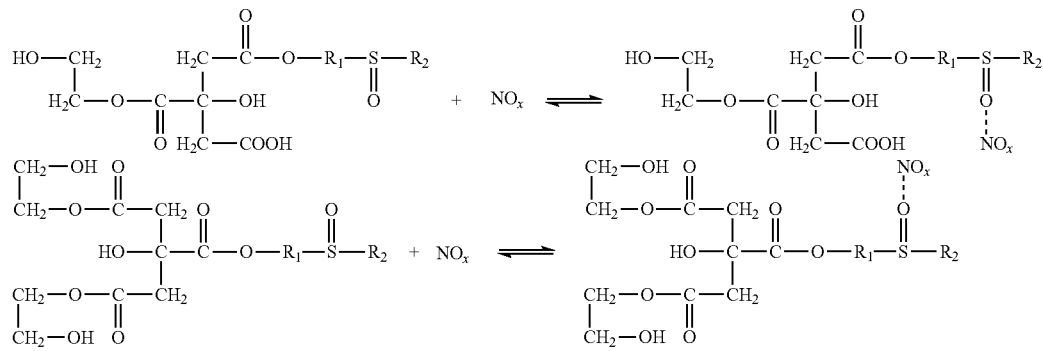

For the desulfurization-denitration solution with absorbed $NO_X$, the following desorption reaction occurs in a regeneration tower:

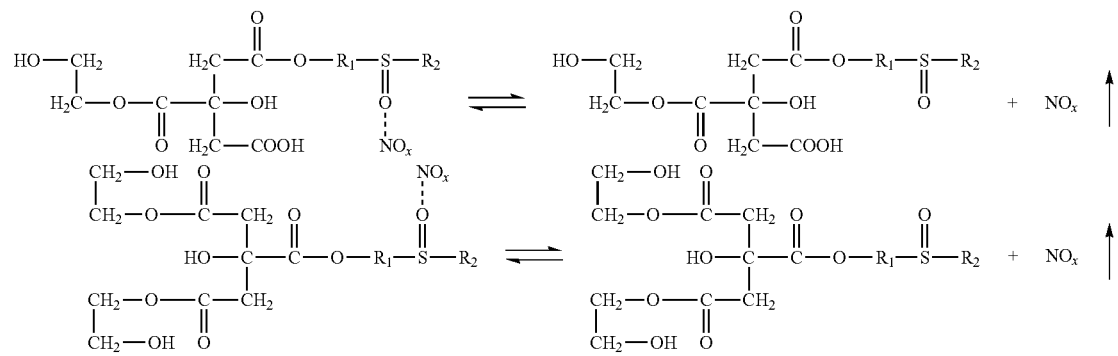

The desulfurization-denitration solution after regeneration is recycled for use.

We formerly submitted patent applications "Method for removing SOx from gas using modified polyethylene glycol" (Application No. 201310409296.8), "Method for removing SOx from gas using composite alcohol amine solution" (Application No. 201310481557.7), "Method for removing SOx from gas using ethylene glycol composite solution" (Application No. 201310682799.2), "Method for removing SOx from gas using polyol composite solution" (Application No. 201310682382.6), and the like, the desulfurization solution taught therein not only has the ability of removing sulfur dioxide from gas, but also has the ability of absorbing nitrogen oxides in the gas. In particular, by adding a small amount of additives containing sulfoxide and/or sulfone group (such as DMSO and/or sulfolane, or hydroxyl and/or carboxyl substitutes thereof) to such solution, the ability of the solution to absorb nitrogen oxides increases greatly.

The flue gas desulfurization-denitration process of the present invention includes the following key processes: afterheat recovery, desulfurization-denitration, regeneration of desulfurization-denitration solution, and concentration of sulfur dioxide and $NO_X$.

1) Afterheat recovery process: the temperature of the flue gas is lowered below 50° C. in a heat transfer recovering way, and afterheat recovery is carried out.

As for present, the ordinary exhaust gas temperature of flue gas is 130° C. to 170° C., and the amount of exhaust flue gas is huge, with considerable sensible heat and latent heat (heat contained in the water vapor in the flue gas). The process of cooling the flue gas from 130° C.-170° C. down to below 50° C. and managing to recover this heat is called the afterheat recovery process. The way of afterheat recovery usually includes indirect heat exchange recovery, direct heat exchange recovery, as well as simultaneous indirect-direct heat exchange recovery. For the way of indirect heat exchange recovery, in a wall-tube heat exchanger, hot flue gas moves along one side of the heat exchange wall, heat storage fluid moves along the other side of the wall, the flue gas is not in contact with the heat storage fluid, the heat storage fluid cools the flue gas down by heat conduction through wall surface indirectly, while the temperature of the heat storage fluid rises. For the way of direct heat exchange, in a direct heat exchanger, the heat storage fluid is in direct contact with the flue gas (either in counter-current contact or in co-current contact), the flue gas is cooled, while the temperature of the heat storage fluid rises. For the way of simultaneous indirect-direct heat exchange recovery, in the process of afterheat recovery, there are both the way of direct heat exchange recovery and the way of indirect heat exchange recovery. In the way of direct heat exchange recovery, the heat storage fluid described herein is a liquid, preferably a high boiling, less volatile, water-immiscible liquid, such as silicone oil, paraffin oil, high boiling fat oil, and the like. In the way of indirect heat exchange recovery, the heat storage fluid described herein may be either a liquid or a gas. The high-temperature heat storage fluid with heat abosorbed from the flue gas can be used as a heat source for heating make-up water of boiler, or can be used in any other places where heating is needed. In view of the high cost of an indirect heat exchange recovering device, the way of direct heat exchange recovery and the way of simultaneous indirect-direct heat exchange recovery are preferably used for afterheat recovery.

2) Desulfurization-denitration process: In the absorption tower, sulfur dioxide and/or nitrogen oxides in the flue gas or various combustion tail (waste) gases are absorbed by the desulfurization-denitration solution, and the said desulfurization-denitration solution is a composite solution containing polyol and/or polymeric polyol. In the absorption tower, flue gas with a temperature below 50° C. contacts with a desulfurization-denitration solution (usually referred to as a "desulfurization-denitration lean solution") directly, and the sulfur dioxide in the flue gas is absorbed by the desulfurization-denitration lean solution, while nitrogen oxides and carbon dioxide in the flue gas may also be absorbed partially by the desulfurization-denitration lean solution, and then the desulfurization-denitration lean solution is converted into a "desulfurization-denitration rich solution". The desulfurization-denitration rich solution flows out of the absorption tower, and is sent to the desulfurization-denitration solution regeneration process. After purified by desulfurization-denitration, the flue gas (it is better that its temperature is 5° C. higher than the ambient temperature) is discharged through a chimney into atmosphere. The principle of absorbing sulfur dioxide by the desulfurization-denitration solution in the process of desulfurization-denitration has been described in considerable detail in our patent technologies, and will not be described here.

3) Regeneration process of desulfurization-denitration solution: In the regeneration tower, the desulfurization-denitration rich solution with absorbed sulfur dioxide and/or nitrogen oxides releases the sulfur dioxide and/or nitrogen oxides by ways of heating and/or gas stripping and/or vacuum regeneration, and the desulfurization-denitration solution after regeneration is recycled for use.

The desulfurization-denitration rich solution sent by the desulfurization-denitration process has a lower temperature, and after indirect heat exchange (usually through a tubular heat exchanger) with the desulfurization-denitration lean solution flowing out of the bottom of the regeneration tower, it is again heated to above 90° C., and then enters from the upper end of the regeneration tower. In the regeneration tower, desulfurization-denitration rich solution contacts with a hot gas for stripping from the bottom (the gas for stripping may be an inert gas, such as nitrogen, argon, water vapor, or the like, with a temperature higher than the saturated steam temperature of water corresponding to the pressure in the regeneration tower) sufficiently in a counter-current way. Sulfur dioxide, nitrogen oxides, carbon dioxide, and the like dissolved in the desulfurization-denitration rich solution are desorbed, and mixed with the gas for stripping to form a mixed gas, which comes out from the top of the regeneration tower, and is sent to the concentration process for concentrating treatment. The desulfurization-denitration rich solution after regeneration becomes the desulfurization-denitration lean solution, flows out of the bottom of the regeneration tower, and is subjected to heat exchange and cooling to below 50° C., and then is sent to the desulfurization-denitration process for recycle use. Here, heating and gas stripping methods are used for the regeneration of the desulfurization-denitration solution, hence it is called gas stripping and heating desulfurization-denitration solution regeneration tower (or desulfurization-denitration solution regenerator), which is a binary regenerator. In order to improve the regeneration effect, a vacuum pump is used for vacuumization, such that the desulfurization-denitration solution regeneration tower has a certain degree of vacuum, while three ways are used for the regeneration of the desulfurization-denitration solution, namely gas stripping, heating, and vacuum, hence it is called gas stripping, heating, and vacuum desulfurization-denitration solution regeneration tower (or desulfurization-denitration solution regenerator), which is a ternary regenerator. In turn, to further improve the regeneration effect, an ultrasonic regeneration system and/or microwave regeneration system and/or radiation regeneration system may also be installed in the desulfurization-denitration solution regeneration tower (or the desulfurization-denitration solution regenerator), forming a multiple desulfurization-denitration solution regeneration tower (or desulfurization-denitration solution regenerator) involving gas stripping, heating, vacuum and ultrasonic wave, and/or microwave, and/or radiation, which is a multiple regenerator.

4) Sulfur dioxide and/or nitrogen oxides concentration process: In a concentration tower, the released sulfur dioxide and/or nitrogen oxides are concentrated into a sulfur dioxide gas (or liquid) product and/or nitrogen oxide gas product with a higher purity.

The mixed gas released during regeneration of the desulfurization-denitration solution enters from the middle section of the concentration tower, contacts with the condensed water from the top of the concentration tower in a counter-current way to condense the water vapor in the mixed gas. The mixed gas with water vapor removed flows out of the top of the concentration tower, the main component of the gas is sulfur dioxide, and there are also some components such as nitrogen oxides, carbon dioxide, and the like, in which sulfur dioxide can be further compressed, cooled and processed into pure liquid sulfur dioxide, or reduced to sulfur with coke, or processed into sulfuric acid; nitrogen oxides can also be reduced to nitrogen, or used as raw materials for nitric acid; the remaining gas can be returned to the process of desulfurization-denitration for treatment and then vented; Water vapor enters from the bottom end of the concentration tower, contacts with the condensed water in a counter-current way. Residual sulfur dioxide, nitrogen oxides, and other harmful ingredients in the condensed water are extracted by the water vapor, thus the function of concentrating sulfur dioxide and nitrogen oxide gases is achieved. At the same time, remove harmful sulfur dioxide, nitrogen oxides, and other ingredients in the condensed water. Make the condensed water turn into distilled water and flow out of the bottom of the concentration tower, and be recycled to boiler water.

The corresponding key devices in the flue gas desulfurization-denitration process and device of the present invention include: afterheat recovery tower (or afterheat recoverer), absorption tower, regeneration tower, and concentration tower, in which:

The afterheat recovery tower: is used for heat exchange between the flue gas and the heat storage fluid, lowering the temperature of the flue gas to below 50° C., and carrying out afterheat recovery;

The absorption tower: is used for the direct contact of the cooled flue gas with the desulfurization-denitration solution, such that the desulfurization-denitration solution absorbs sulfur dioxide and/or nitrogen oxides in the flue gas and turns into the desulfurization-denitration rich solution, and then is discharged from the absorption tower. The said desulfurization-denitration solution is a composite solution containing polyol and/or polymeric polyol;

The regeneration tower: is used for desorbing sulfur dioxide and/or nitrogen oxides from the desulfurization-denitration rich solution, which in turn is converted into the desulfurization-denitration lean solution, by ways of heating and/or gas stripping and/or vacuum regeneration. The desulfurization-denitration lean solution obtained by regeneration is sent back to the absorption tower for recycle use;

The concentration tower: is used for removing, by condensation, the water vapor from the mixed gas comprising sulfur dioxide and/or nitrogen oxides, which is released by the regeneration of the desulfurization-denitration rich solution in the regeneration tower, such that sulfur dioxide and/or nitrogen oxides is condensed into a sulfur dioxide and/or nitrogen oxide gas or liquid product with a higher purity.

Further, the said afterheat recovery tower may be provided with one or more stages of afterheat recovery internal circulation pumps to increase the circulation volume of the heat storage fluid. The absorption tower may also be provided with one or more stages of desulfurization-denitration internal circulation pumps to increase the circulation volume of the desulfurization-denitration solution.

Preferably, a heat exchanger is provided between the absorption tower and the regeneration tower, and the desulfurization-denitration rich solution from the absorption tower and the desulfurization-denitration lean solution flowing out of the regeneration tower are subjected to indirect heat exchange through the heat exchanger.

In a specific implementation of the present invention, the said processes and devices for the desulfurization-denitration, the regeneration of the desulfurization-denitration solution and the concentration of sulfur dioxide and/or nitrogen oxides in the flue gas desulfurization-denitration process and device are shown in FIG. 1.

The afterheat recovery process and devices in the flue gas desulfurization-denitration process and device of the present invention preferably fall into two categories, as shown in FIG. 2 and FIG. 3, respectively.

Compared with the conventional wet desulfurization process (such as calcium desulfurization process, ammonia desulfurization process, and the like), the present invention has the following advantages: (1) When a conventional wet desulfurization processes is used for the desulfurization of a flue gas, the by-products are calcium sulfate and calcium sulfite, or ammonium sulfate and ammonium sulfite, while the by-product of the flue gas desulfurization-denitration process and device of the present invention is sulfur dioxide with a high purity, such by-product is an important chemical raw material, and has a wide market and great application value; (2) the desulfurizing agent used in the conventional wet desulfurization process (such as calcium desulfurization process, ammonia desulfurization process, and the like) is calcium carbonate, calcium oxide and/or ammonia; when calcium carbonate is used as the desulfurizing agent, a large calcium carbonate consumption is required, whereas calcium carbonate mining will seriously damage the environment, causing water loss and soil erosion, landslides and the destruction of ecological environment; when calcium oxide is used as the desulfurizing agent, a large calcium oxide consumption is required, whereas calcium oxide is obtained by calcination of calcium carbonate and coal, a large-scale calcium carbonate mining is also needed, and a large amount of coal is consumed, resulting in serious secondary pollution, water loss and soil erosion, landslides and the destruction of ecological environment; when ammonia is used as the desulfurizing agent, the ammonia production process itself is a serious process with high pollution and high energy consumption, flammablity and explosiveness. Also as ammonia is volatile, it will be carried in a large amount by the flue gas into the environment, causing serious phenomenon of secondary pollution, the desulfurization-denitration agents corresponding to the flue gas desulfurization-denitration process and device of the present invention are organic polyol polyacid ester solvents with high boiling point, non-toxicity, harmlessness and high security, which can be fully recycled for use, without consumption of calcium carbonate and/or calcium oxide and/or ammonia, and without any secondary pollution; (3) conventional wet desulfurization process (such as the calcium desulfurization process) uses a large amount of minerals, calcium carbonate or calcium oxide, tiny hydrophilic and non-hydrophilic particles contained in the slurry (mainly calcium salt particles, aluminum salt particles, magnesium salt particles, titanium salt particles, iron salt particles, lead salt particles, zinc salt particles, cobalt salt particles, rare earth element particles, radioactive element particles and particles of other harmful elements, mineral particles such as silica particles, mullite particles, silicate particles, and phosphate particles and the like) are discharged into atmosphere together with the flue gas, while sulfur dioxide, sulfur trioxide, hydrogen chloride, hydrogen fluoride, nitrogen oxides, harmful organic substances, bacteria, and the like are readily adsorbed on the surface of these particles, thus the content of atmospheric suspended particles (which are generally referred to as PM100, PM10, PM2.5, etc.) is increased significantly, resulting in the phenomena of haze and atmospheric photochemical reactions, and causing serious environmental pollution. The flue gas desulfurization-denitration process and device of the present invention are used for the desulfurization-denitration of flue gases or exhaust gases, and there are no such phenomena. Wide applications of the present invention may eliminate the phenomena of haze and atmospheric photochemical reactions; (4) conventional wet desulfurization process has a high operation cost and cannot produce economic benefits; whereas the flue gas desulfurization-denitration process and device of the present invention have a low operation cost and a high desulfurization-denitration efficiency, at the same time, wastes are converted into valuable chemical raw materials, producing greater economic, social and environmental benefits; (5) conventional wet desulfurization process will produce insoluble precipitates of calcium salt or ammonium salt throughout the desulfurization and regeneration processes, which clog devices and pipelines, whereas the flue gas desulfurization-denitration process and device of the present invention will not produce insoluble precipitates of calcium salt or ammonium salt; (6) conventional wet desulfurization process is only applicable to the desulfurization of gases with lower sulfur contents, whereas the flue gas desulfurization-denitration process and device of the present invention can be used for the desulfurization-denitration of both gases with low sulfur contents and gases with high sulfur contents. At the same time, the desulfurization-denitration of the flue gas desulfurization-denitration process and device of the present invention has a high degree of purification, and the total sulfur contents in the gases can be reduced steadily below 50 mg/m$^3$, and the solution has a high boiling point, the loss is less, the gas-liquid ratio of desulfurization-denitration is large, and the energy consumption is low, meanwhile with low operation cost, short process, less investment, and simple operation.

The flue gas desulfurization-denitration process and device of the present invention have a wide range of industrial applications, and can be used for simultaneous removal of sulfur dioxide and nitrogen oxides in the gas, or can be used for removal of sulfur dioxide in the gas alone, or can be used for removal of nitrogen oxides in the gas alone. They can be used for desulfurization-denitration of flue gases, incineration gases, coke-oven gases, synthetic waste gases from dyestuff plants, pollutant gases discharged from chemical fiber plants and other industrial raw material gases or waste gases containing SOx. The total sulfur contents in the above sulfur containing gases are less than 99.9% (volume ratio).

DESCRIPTION OF DRAWINGS

In FIG. 1: 1 denotes a flue gas with a temperature below 50° C.; 2 denotes a booster fan; 3 denotes an absorption tower; 4 denotes a desulfurization-denitration internal circulation pump; 5 denotes a chimney; 6 denotes a flue gas after desulfurization-denitration; 7 denotes a desulfurization-denitration lean solution; 8 denotes a desulfurization-denitration rich solution; 9 denotes a rich solution pump; 10 denotes a desulfurization-denitration pump; 11 denotes a lean solution tank; 12 denotes a lean solution pump; 13 denotes a cooler; 14 denotes a heat exchanger; 15 denotes cooling water; 16 denotes hot water; 17 denotes a rich solution heater; 18 denotes a hot medium; 19 denotes a cold medium; 20 denotes a regeneration tower; 21 denotes a regenerated desorption gas; 22 denotes stripping steam; 23 denotes a concentration tower; 24 denotes a distilled water pump; 25 denotes a concentrated gas of sulfur dioxide and/or nitrogen oxides; 26 denotes distilled water. Each circled symbol in the figure has the following meanings: $F_1$, $F_2$, $F_3$, and $F_4$ denote the flow rate of the flue gas 1, the flow rate of the desulfurization lean solution 7, the flow rate of the steam entering into the regeneration tower 20, and the flow rate of the steam entering into the concentration tower 23, respectively; $A_1$ denotes the composition of the flue gas 1; $A_2$ denotes the composition of the flue gas after desulfurization-denitration 6; $A_3$ denotes the composition of the concentrated gas of sulfur dioxide and/or nitrogen oxides 25; $A_4$ denotes $SO_2$ and NO content in the desulfurization-denitration rich solution 8; $A_5$ denotes $SO_2$ and NO content in the desulfurization-denitration lean solution 7 after regeneration; $A_6$ denotes $SO_2$ and NO content in the distilled water 26; $P_1$ denotes a bottom pressure of the absorption tower 3; $P_2$ denotes a top pressure of the absorption tower 3; $P_3$ denotes the pressure in the regeneration tower 20; $P_4$ denotes the pressure of steam 22; $P_5$ denotes the pressure in the concentration tower 23; $T_1$ denotes the temperature of the flue gas 1; $T_2$ denotes the temperature of the flue gas after desulfurization-denitration 6; $T_3$ denotes the temperature in the absorption tower 3; $T_4$ denotes the temperature of the desulfurization-denitration lean solution 7 entering into the absorption tower 3; $T_5$ denotes the temperature of the desulfurization-denitration lean solution 7 coming out of the cooler 13; $T_6$ denotes the temperature of the desulfurization-denitration lean solution coming out of the heat exchanger 14; $T_7$ denotes the temperature of the desulfurization-denitration rich solution entering into the heat exchanger 14; $T_8$ denotes the temperature of the desulfurization-denitration lean solution entering into the heat exchanger 14; $T_9$ denotes the temperature of the desulfurization-denitration rich solution coming out of the heat exchanger 14; $T_{10}$ denotes the temperature at which the desulfurization-denitration rich solution enters into the regeneration tower 20; $T_{11}$ denotes the temperature in the regeneration tower 20; $T_{12}$ denotes the temperature of the regenerated desorption gas 21; $T_{13}$ denotes the temperature of the steam 22; $T_{14}$ denotes the temperature of the distilled water 26; $T_{15}$ denotes the temperature in the concentration tower 23; and $T_{16}$ denotes the temperature of the concentrated gas of sulfur dioxide and/or nitrogen oxides 25.

In FIG. 2: 27 denotes a flue gas with a temperature of 130-180° C. from a boiler; 28 denotes a flue gas with a temperature below 50° C. after the afterheat recovery; 29 denotes a direct heat exchange type afterheat recovery tower; 30 denotes an afterheat recovery internal circulation pump; 31 denotes a heat storage fluid which is hot; 32 denotes a heat storage fluid pump; 33 denotes a heat storage fluid settling tank; 34 denotes dusts and water; 35 denotes a heat storage fluid external circulation pump; 36 denotes a heat storage fluid radiator; 37 denotes a heat storage fluid cooler; 38 denotes a heat storage fluid which is cold; 39 denotes a medium to be heated; 40 denotes a heated medium; 41 denotes cooling water; and 42 denotes hot water.

In FIG. 3: 27 denotes a flue gas with a temperature of 130-180° C. from a boiler; 28 denotes a flue gas with a temperature below 50° C. after the afterheat recovery; 29 denotes a direct heat exchange type afterheat recovery tower; 30 denotes an afterheat recovery internal circulation pump; 31 denotes a heat storage fluid which is hot; 32 denotes a heat storage fluid pump; 33 denotes a heat storage fluid settling tank; 34 denotes dusts and water; 35 denotes a heat storage fluid external circulation pump; 37 denotes a heat storage fluid cooler; 38 denotes a heat storage fluid which is cold; 39 denotes a medium to be heated; 40 denotes a heated medium; 41 denotes cooling water; 42 denotes hot water; and 43 denotes a heat recoverer for indirect heat exchange of a flue gas.

DETAILED DESCRIPTION

The flue gas desulfurization-denitration process and device of the present invention will be described below in conjunction with specific embodiments. The embodiments are intended to better illustrate the present invention, and should not be construed as limiting the claims of the present invention.

Figure 1:
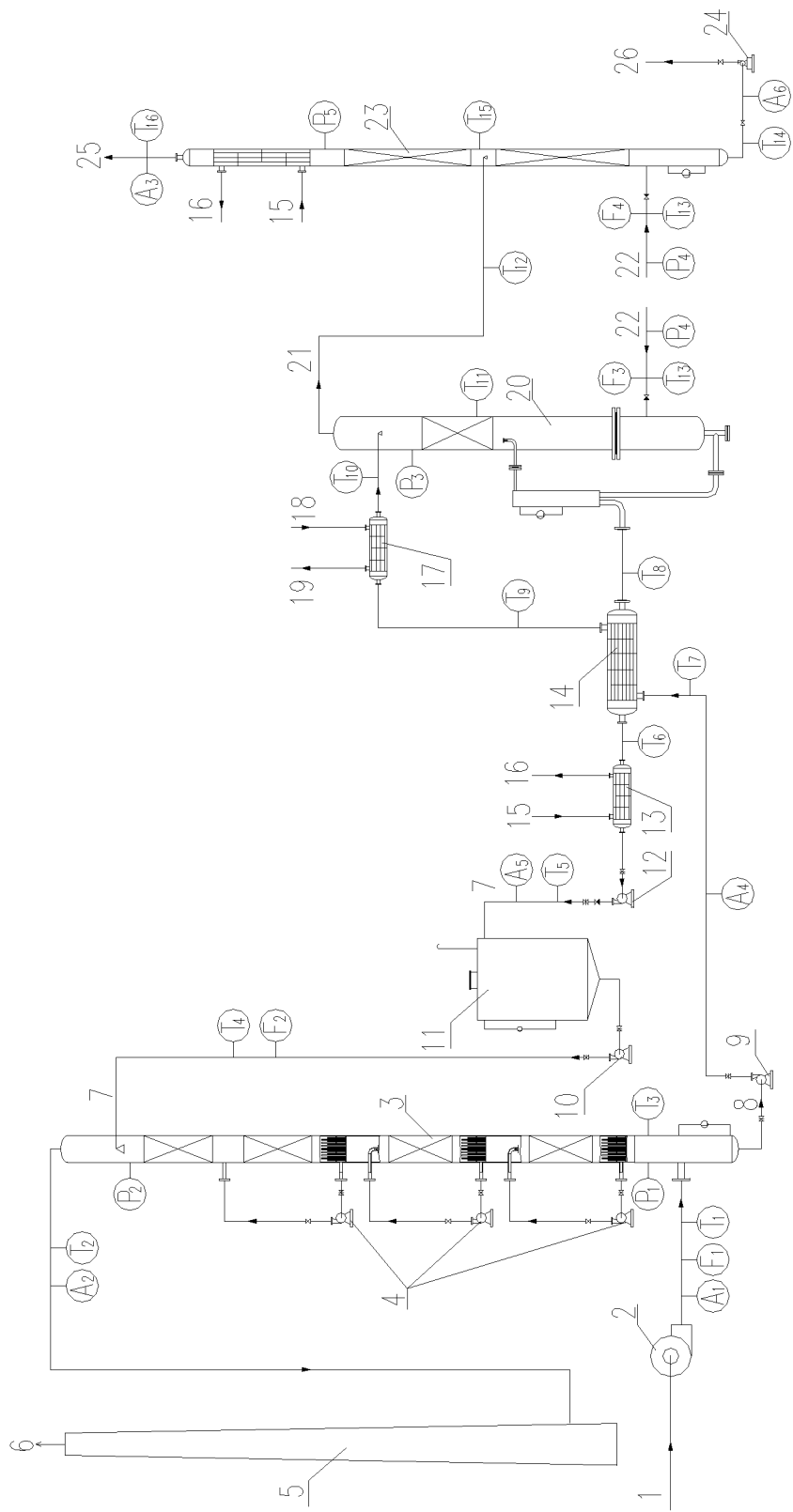
FIG. 1 is a schematic diagram of the processes and devices for the flue gas desulfurization-denitration, the regeneration of the desulfurization-denitration solution and the concentration of sulfur dioxide and/or nitrogen oxides.

The operation methods are as follows:

The operation methods of the processes and devices for the flue gas desulfurization-denitration, the regeneration of the desulfurization-denitration solution and the concentration of sulfur dioxide and/or nitrogen oxides are shown in FIG. 1: A flue gas 1 with a temperature below 50° C. is pressurized by a booster fan 2 and then enters into an absorption tower 3 from the bottom. At the same time, a desulfurization-denitration lean solution 7 enters into the absorption tower 3 from the top. In the absorption tower 3, the flue gas 1 is brought into direct contact with the desulfurization-denitration lean solution 7. At this point, sulfur dioxide, some nitrogen oxides and carbon dioxide in the flue gas 1 are absorbed by the desulfurization-denitration lean solution 7. After sulfur dioxide, some nitrogen oxides and carbon dioxide are absorbed, the flue gas 1 is converted into a flue gas 6 after desulfurization-denitration, flows out of the top of the absorption tower 3, and is discharged through a chimney 5 into atmosphere, while the contents $A_1$ and $A_2$ of sulfur dioxide, nitrogen oxides and carbon dioxide in the flue gas 1 with a temperature below 50° C. and in the flue gas 6 after desulfurization-denitration are analyzed online. In order to increase the gas-liquid contact surface, extend the gas-liquid contact time, and improve the desulfurization efficiency, it is needed to increase the circulation volume of the desulfurization-denitration lean solution 7 in the absorption tower 3, this in turn requires increased number of stages (or units) of the desulfurization-denitration internal circulation pump 4 in the absorption tower 3, the increased number can be 0, or 1, or 2, or 3, or 4 . . . or n (n is a positive integer), and so on. The specific increased number of stages that is required can be determined by the sulfur dioxide and/or nitrogen oxides content of the flue gas after desulfurization-denitration at the top outlet of the absorption tower 3. The desulfurization-denitration lean solution 7 with absorbed sulfur dioxide, some nitrogen oxides and carbon dioxide is converted into a desulfurization-denitration rich solution 8, flows out of the bottom of the absorption tower 3, is pressurized by a rich solution pump 9, and is subjected to heat exchange in the shell pass of a heat exchanger 14 with the hot desulfurization-denitration lean solution 7 from the regeneration tower 20 to rise the temperature, and is then heated by a hot medium 18 (the hot medium may be a liquid with a temperature higher than 100° C., or may be a flue gas of 130° C.-170° C., or may be a water vapor with a temperature higher than 100° C.) to above 90° C. through a rich solution heater 17. The desulfurization-denitration rich solution 8 with a temperature higher than 90° C. enters into the regeneration tower 20 from the upper end, while a stripping steam 22 enters into the regeneration tower 20 from the bottom. In the regeneration tower 20, the desulfurization-denitration rich solution 8 with a temperature higher than 90° C. is brought into direct contact with the stripping steam 22. At this point, sulfur dioxide, some nitrogen oxides and carbon dioxide in the desulfurization-denitration rich solution 8 are desorbed, and enter into the stripping steam 22 to be mixed into a regenerated desorption gas 21, which flows out of the top of the regeneration tower 20. After releasing sulfur dioxide, some nitrogen oxides and carbon dioxide, the desulfurization-denitration rich solution 8 with a temperature higher than 90° C. is converted into the hot desulfurization-denitration lean solution 7 with a temperature higher than 90° C., which flows out of the bottom of the regeneration tower 20 and is subjected to heat exchange with the desulfurization-denitration rich solution 8 sent from the rich solution pump 9 in the tube pass and shell pass of the heat exchanger 14 to lower the temperature. The cooled desulfurization-denitration lean solution 7 moves along the tube pass of the cooler 13, is cooled to a normal temperature by the cooling water 15 in the shell pass, and is pressurized by a lean solution pump 12 and sent to a lean solution tank 11. Then, the desulfurization-denitration lean solution 7 in the lean solution tank 11 is pressurized by a desulfurization pump 10 and sent to the absorption tower 3 for desulfurization-denitration. The desulfurization-denitration solution is converted in such a way: in the absorption tower 3, the desulfurization-denitration lean solution 7 absorbs sulfur dioxide, some nitrogen oxides and carbon dioxide, and is converted into the desulfurization-denitration rich solution 8, whereas in the regeneration tower 20, the desulfurization-denitration rich solution 8 is heated, stripped and/or vacuum regenerated and again converted into the desulfurization-denitration lean solution 7, and the desulfurization-denitration lean solution 7 is again recycled for use, and it cycles continuously like this. The regenerated desorption gas 21 flowing out of the top of the regeneration tower 20 enters into a concentration tower 23 from the middle, and contacts with the distilled water condensed at the upper end of the concentration tower 23. In the condensation segment of the concentration tower 23, water vapor in the regenerated desorption gas 21 is condensed by the cooling water 15. A concentrated gas 25 of sulfur dioxide and/or nitrogen oxides comprised of non-condensing mixed gas of sulfur dioxide, nitrogen oxides, carbon dioxide, and the like flows out of the concentration tower 23, and can be recovered as a raw material gas. Simultaneously condensed distilled water contains sulfur dioxide and the like, continues flowing to the bottom of the concentration tower 23, and contacts with the stripping steam 22 from the bottom. Sulfur dioxide and other gases in the distilled water are stripped and desorbed by stripping steam 22, such that the condensed water is essentially free of sulfur dioxide and other gases, reaching a standard of distilled water for recovery 26, and is sent for recycle use by a distilled water pump 24. Throughout the process, the cooling water 15 is heated and converted into hot water 16, which can be recovered as make-up hot water for boiler. After releasing heat, the hot medium 18 is converted into a cold medium 19. The cold medium 19 may be distilled water or other liquid, which can be used in continuation to absorb heat, and then converted into the hot medium 18 for repeated use. When the cold medium 19 is a cooled flue gas, cooling is continued until the temperature of the flue gas 1 goes below 50° C.

Figure 2:
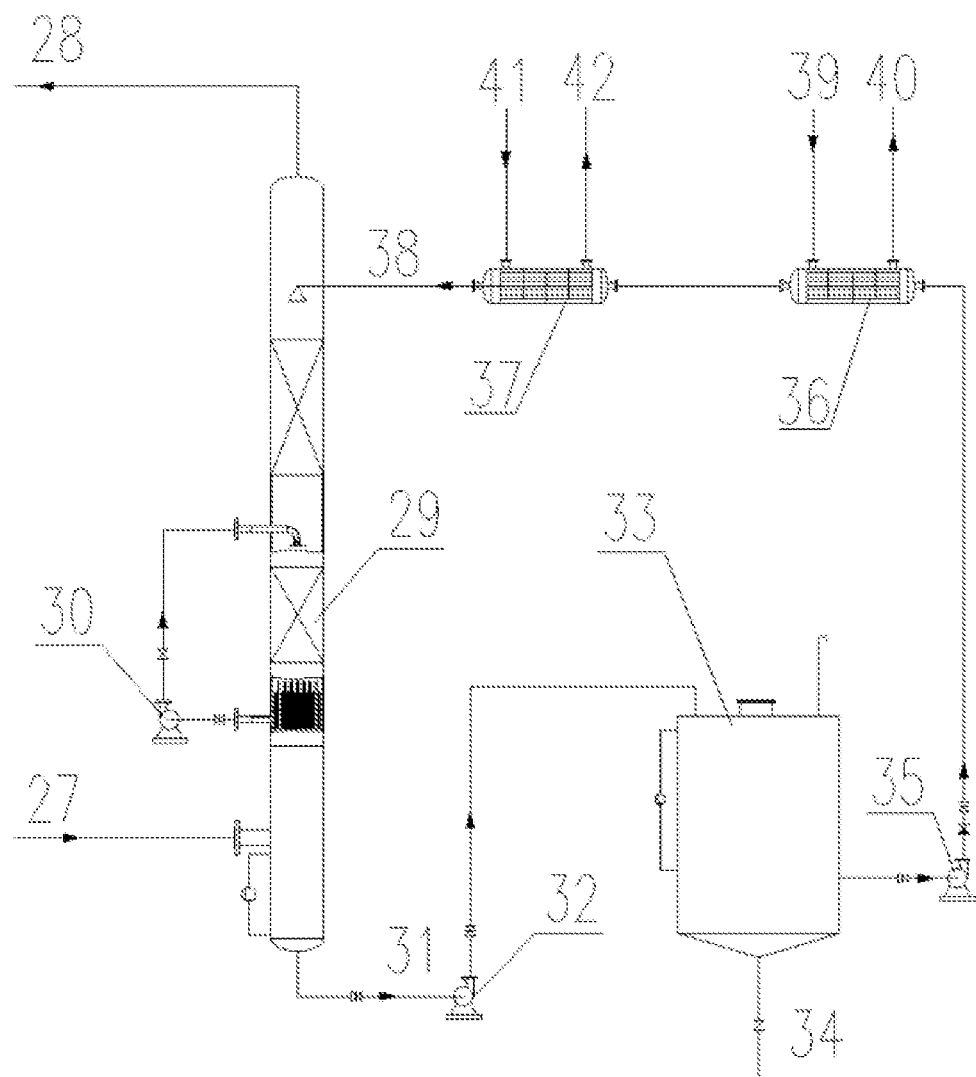
FIG. 2 is a schematic diagram of the process and devices for the way of direct heat exchange recovery in the flue gas afterheat recovery.

The process and operation methods of devices for the way of direct heat exchange recovery in the flue gas afterheat recovery are shown in FIG. 2: A flue gas 27 from a boiler with a temperature of 130-180° C. enters into a direct heat exchange type afterheat recovery tower 29 from the bottom, and directly contacts with a heat storage fluid which is cold 38 sprayed from the top of the tower for direct heat exchange, while the flue gas 27 with a temperature of 130-180° C. from the boiler is cooled and converted into a flue gas 28 with a temperature below 50° C., and discharged from the top of the direct heat exchange type afterheat recovery tower 29. In order to increase the gas-liquid contact area, extend the gas-liquid contact time, and improve the heat exchange effect, it is needed to increase the circulation volume of the heat storage fluid in the direct heat exchange type afterheat recovery tower 29, this in turn needs to increase the number of stages (or units) of the afterheat recovery internal circulation pump 30 in the direct heat exchange type afterheat recovery tower 29, the increased number of the stages (or units) of the afterheat recovery internal circulation pump 30 can be 0, or 1, or 2, or 3, or 4 . . . or n (n is a positive integer), the specific increased number of stages that is required can be determined by the temperature of the flue gas 28 discharged from the top of the direct heat exchange type afterheat recovery tower 29. In the direct heat exchange type afterheat recovery tower 29, the heat storage fluid which is cold 38 absorbs heat of the flue gas 27 and is then converted into a heat storage fluid which is hot 31, its temperature is close to or below the temperature of the flue gas 27. At the same time, the heat storage fluid which is cold 38 will also adsorb and enrich HCl, HF, and tiny dusts (including water-soluble and water-insoluble, namely polar and nonpolar tiny particles, such particles are generally referred to as PM100 and/or PM50 and/or PM2.5, and the like) in the flue gas 27. Additionally, some water vapor in the flue gas 27 will be condensed into water, mixed together in the heat storage fluid which is hot 31, and discharged from the bottom of the direct heat exchange type afterheat recovery tower 29, sent to a heat storage fluid settling tank 33 by a heat storage fluid pump 32 for settling. Dusts containing HCl and HF as well as water 34 are separated, and discharged from the bottom of the heat storage fluid settling tank 33. After removal of dusts and water, the heat storage fluid which is hot 31 is pressurized by a heat storage fluid external circulation pump 35 and sent to a heat storage fluid radiator 36. In the heat storage fluid radiator 36, most of the heat is transferred to a medium to be heated 39, and after absorbing the heat, the medium to be heated 39 becomes a heated medium 40, and is used as a heat source for heat recovery. After releasing some heat, the heat storage fluid which is hot 31 enters into a heat storage fluid cooler 37 to be cooled by cooling water 41 to a normal temperature, and is converted into the heat storage fluid which is cold 38, which enters into the direct heat exchange type afterheat recovery tower 29 for repeated heat absorption. At the same time, cooling water 41 absorbs heat and is then converted into hot water 42, wherein the heat can be recovered for use.

Figure 3:
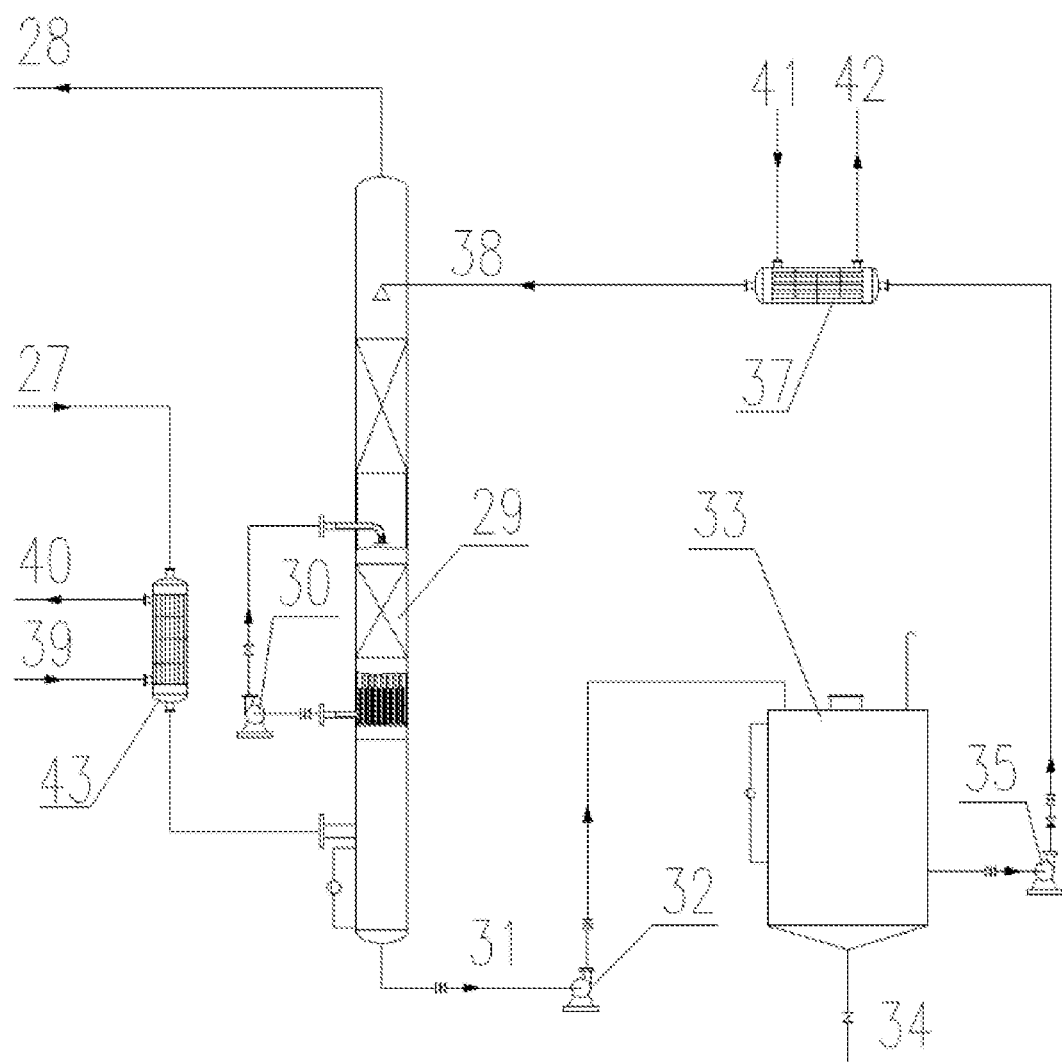
FIG. 3 is a schematic diagram of the process and devices for the way of heat recovery of simultaneous direct-indirect heat exchange in the flue gas afterheat recovery.

The process and operation methods of devices for the way of heat recovery of simultaneous direct-indirect heat exchange in the flue gas afterheat recovery are shown in FIG. 3: A flue gas 27 from a boiler with a temperature of 130-180° C. enters into a flue gas indirect heat exchange type heat recoverer 43, and by way of indirect heat exchange, some heat is absorbed by a medium to be heated 39, which is then converted into a heated medium 40. The temperature of the heated medium 40 is close to is close to but lower than the temperature of the flue gas 27 with a temperature of 130-180° C. from a boiler. The heated medium 40 can be recovered as a heat source. After releasing some heat, the flue gas 27 enters into a direct heat exchange type afterheat recovery tower 29 from the bottom, and is brought into direct contact with a heat storage fluid which is cold 38 sprayed from the top of the tower for direct heat exchange, while the flue gas 27 is cooled and converted into a flue gas 28 with a temperature below 50° C., and discharged from the top of the direct heat exchange type afterheat recovery tower 29. In order to increase the gas-liquid contact area, extend the gas-liquid contact time, and improve the heat exchange effect, it is needed to increase the circulation volume of the heat storage fluid in the direct heat exchange type afterheat recovery tower 29, this in turn needs to increase the number of stages (or units) of the afterheat recovery internal circulation pump 30 in the direct heat exchange type afterheat recovery tower 29, the increased number of the stages (or units) of the afterheat recovery internal circulation pump 30 can be 0, or 1, or 2, or 3, or 4 . . . or n (n is a positive integer), the specific increased number of stages that is required can be determined by the temperature of the flue gas 28 discharged from the top of the direct heat exchange type afterheat recovery tower 29. In the direct heat exchange type afterheat recovery tower 29, the heat storage fluid which is cold 38 absorbs heat of the flue gas 27 and is then converted into a heat storage fluid which is hot 31, its temperature is close to or below the temperature of the flue gas 27 entering into the direct heat exchange type afterheat recovery tower 29 from the bottom. At the same time, the heat storage fluid which is cold 38 will also adsorb and enrich HCl, HF, and tiny dusts (including water-soluble and water-insoluble, namely polar and nonpolar tiny particles, such particles are generally referred to as PM100 and/or PM50 and/or PM2.5, and the like) in the flue gas 27. Additionally, some water vapor in the flue gas 27 will be condensed into water, mixed together in the heat storage fluid which is hot 31, and discharged from the bottom of the direct heat exchange type afterheat recovery tower 29, sent to a heat storage fluid settling tank 33 by a heat storage fluid pump 32 for settling. Dusts containing HCl and HF as well as water 34 are separated, and discharged from the bottom of the heat storage fluid settling tank 33. After removal of dusts and water, the heat storage fluid which is hot 31 is pressurized by a heat storage fluid external circulation pump 35 and sent to a heat storage fluid cooler 37 to be cooled by cooling water 41 to a normal temperature, and is converted into the heat storage fluid which is cold 38, which then enters into the direct heat exchange type afterheat recovery tower 29 for repeated heat absorption. At the same time, cooling water 41 absorbs heat and is then converted into hot water 42, wherein the heat can be recovered for use.

According to the processes and devices for the flue gas desulfurization-denitration, the regeneration of the desulfurization-denitration solution and the concentration of sulfur dioxide and/or nitrogen oxides shown in FIG. 1, a small-sized flue gas desulfurization-denitration apparatus which simulates industrial production was made and installed. The specifications for various devices in the apparatus are as follows:

Specifications for absorption tower 3: φ219×4, total height 7.2 m, 4-layer packing, each 1 m high, material 316L stainless steel;

Specifications for lean solution tank 11: φ450×3, total height 2.0 m, material 316L stainless steel;

Cooler 13: φ159×3, tube φ10×1, length 1.5 m, total heat exchange area 3.9 m², material 316L stainless steel;

Heat exchanger 14: φ159×3, 2 units, tube φ10×1, length 1.5 m, heat exchange area 2×3.9 m², φ219×3, 1 unit, tube φ6×1, length 1.4 m, heat exchange area 9.63 m², total heat exchange area 2×3.9+9.63=17.43 m², material 316L stainless steel;

Rich solution heater 17: φ159×3, tube φ32×1, length 0.9 m, total heat exchange area 1.63 m², material titanium;

Specifications for regeneration tower 20: φ219×4, total height 5.57 m, upper section with one layer of packing 1.5 m high, lower end empty tower, material 316L stainless steel;

Specifications for concentration tower 23: φ159×4, total height 6.2 m, upper end titanium tube condenser, middle section with one layer of packing 1.5 m high, lower section with one layer of packing 2.0 m high, material 316L stainless steel.

Booster fan 2: Model 2HB710-AH37, air volume 318 m³/hr, air pressure −290~390 mbar (−29 kPa~39 kPa), Shanghai Likai Mechanical & Electrical device Co., Ltd.;

Internal circulation pump 4: Model IHG20-125, flow 4.0 m³/hr, head 20 m, 0.75 KW, 3 units, material 316L stainless steel, Shanghai Changshen Pump Manufacturing Co., Ltd.;

Rich solution pump 9, desulfurization pump 10 and lean solution pump 12: models are the same IHG25-160, flow 4.0 m³/hr, head 32 m, 1.5 KW, 1 unit for each, material 316L stainless steel, Shanghai Changshen Pump Manufacturing Co., Ltd.;

Distilled water pump 24: all models WB50/037D, flow 1.2 m³/hr, head 14.5 m, 0.37 KW, 1 unit, material 316L stainless steel, Guangdong Yongli Pump Co., Ltd.;

Flue gas flowmeter: Model LZB-50 glass rotor flowmeter, measuring range 50-250 m³/hr, Jiangyin Keda Instrument Factory;

Desulfurization-denitration solution flowmeter: rich solution pump, lean solution pump and desulfurization pump outlet liquid flowmeter, LZB-32 S glass pipeline flowmeter, measuring range: 0.4-4 m³/hr, Jiangyin Keda Instrument Factory;

The outlet liquid flowmeter of internal circulation pump in absorption tower: Model LZB-25 S glass pipeline flowmeter, measuring range 0.36-3.6 m³/hr, 3 units, Jiangyin Keda Instrument Factory;

Steam flowmeter (for gas stripping regeneration tower): Model LUGB-2303-P2 vortex shedding flowmeter, measuring range: 8-80 m³/hr, Beijing Bangyu Chengxin Industrial Technology Development Co., Ltd.;

Steam flowmeter (for concentration tower): Model GHLUGB-25 vortex shedding flowmeter, measuring range: 10-60 m³/hr, Tianjin Guanghua Kaite Flow Meter Co., Ltd.;

For the inlet and outlet gases of absorption tower 3 as well as the desorbed gases from the concentration tower 23, all ingredients were subjected to on-line analysis by continuous flue gas analyzer, wherein the contents of $SO_2$, NO and $O_2$ were analyzed by UV-light JNYQ-I-41 type gas analyzer; the content of $CO_2$ was analyzed by JNYQ-I-41C type infrared gas analyzer, manufactured by Xi'an Juneng Instrument Co., Ltd.; At the same time, the contents of $SO_2$, NO and $CO_2$ in a gas were analyzed and calibrated by chemical analysis, and compared with values of instrumental analysis, in which: the content of $SO_2$ in a gas was analyzed by iodometric method, the content of $CO_2$ in a gas was analyzed by barium chloride method, and the content of NO in a gas was analyzed by naphthyl ethylenediamine hydrochloride colorimetric method.

The contents of $SO_2$, NO and $CO_2$ in desulfurization-denitration lean solution 7, desulfurization-denitration rich solution 8 and distilled water 26 were analyzed by chemical method, in which: the content of $SO_2$ in a solution was analyzed by iodometric method, the content of $CO_2$ in a solution was analyzed by barium chloride method, and the content of NO in a solution was analyzed by naphthyl ethylenediamine hydrochloride colorimetric method.

Gas mixing was performed with air, $SO_2$, NO and $CO_2$, the gas ingredients are shown in tables of the test data.

According to our patent technologies, the following desulfurization-denitration solutions were formulated:

1. 15% $Na_2SO_3$ (w) aqueous solution;
2. 20% monopotassium citrate (w) aqueous solution;
3. EG solution;
4. PEG400 solution;
5. PEG400+3% triethanolamine (w) solution;
6. NHD solution (a mixture of polyethylene glycol dimethyl ethers with a degree of polymerization of 4-8);
7. 60% EG (w)+30% $H_2O$ (w)+10% monosodium citrate (w) solution;
8. 60% PEG400 (w)+30% $H_2O$ (w)+10% monosodium citrate (w) solution;
9. 30% EG (w)+30% PEG400 (w)+30% $H_2O$ (w)+10% monosodium citrate (w) solution.

Using these desulfurization-denitration solutions, desulfurization-denitration tests were carried out on the desulfurization-denitration apparatus made and installed as shown in FIG. 1 according to the operation methods described above.

Tests results showed that:

1. When the desulfurization-denitration was carried out by using 15% $Na_2SO_3$ (w) aqueous solution, 20% monopotassium citrate (w) aqueous solution, EG solution and PEG400 solution, respectively, initially the solution had a relatively strong absorption capacity for sulfur dioxide, with an absorption rate of 90% or more, but had no absorption capacity for nitrogen oxides. However, after 2 to 5 days of continuous operation, the solution gradually lost its ability to absorb sulfur dioxide, the solution gradually changed in nature, and the solution could not be regenerated when heated to above 120° C.

2. When the desulfurization-denitration was carried out using PEG400+3% triethanolamine (w) solution and NHD solution, respectively, initially the solution had a relatively strong absorption capacity for sulfur dioxide, with an absorption rate above 90%, absorption capacity for nitrogen oxides also reached 50% or so, However, after 5 to 10 days of continuous operation, the solution gradually turned brownish black, absorption capacities for sulfur dioxide and nitrogen oxides were reduced to 50% and 20% or so, respectively, the solution gradually changed in nature, and a viscous black gelatineous material was produced.

3. When the desulfurization-denitration was carried out using 60% EG (w)+30% $H_2O$ (w)+10% monosodium citrate (w) solution, 60% PEG400 (w)+30% $H_2O$ (w)+10% monosodium citrate (w) solution and 30% EG (w)+30% PEG400 (w)+30% $H_2O$ (w)+10% monosodium citrate (w) solution, respectively, the solution had a relatively strong absorption capacity for sulfur dioxide, with an absorption rate up to 90-100%, and absorption capacity for nitrogen oxides was 40-80%. After 90 days of continuous operation, absorption capacities for sulfur dioxide and nitrogen oxides were unchanged, removal efficiencies for sulfur dioxide and nitrogen oxides were stable, and no changes of nature of the solution were found. Some running test data were extracted therefrom, and listed in Table 1, Table 2 and Table 3, respectively.

It was seen from the test results that, there were little differences among the desulfurization-denitration effects of 60% EG(w)+30% $H_2O$ (w)+10% monosodium citrate (w) solution, 60% PEG400 (w)+30% $H_2O$ (w)+10% monosodium citrate (w) solution and 30% EG (w)+30% PEG400 (w)+30% H$_2$O (w)+10% monosodium citrate (w) solution. The effects were quite ideal, and the solutions were relatively stable.

The test results indicate that, we formerly submitted patent applications "Method for removing SOx from gas using modified polyethylene glycol" (Application No. 201310409296.8), "Method for removing SOx from gas using composite alcohol amine solution" (Application No. 201310481557.7), "Method for removing SOx from gas using ethylene glycol composite solution" (Application No. 201310682799.2), "Method for removing SOx from gas using polyol composite solution" (Application No. 201310682382.6), and the like, the desulfurization solution taught therein not only has the ability of removing sulfur dioxide from gas, but also has the ability of absorbing nitrogen oxides in the gas. In particular, by adding a small amount of additives containing sulfoxide and/or sulfone group (such as DMSO and/or sulfolane, or hydroxyl and/or carboxyl substitutes thereof) to such solution, the ability of the solution to absorb nitrogen oxides increases greatly. Therefore, the use of these solutions in the said process and device of the present invention allows for large-scale industrialized desulfurization and denitration of flue gas and/or waste gas.

TABLE 1

Operation data for the case where 60% EG (w) + 30% H$_2$O (w) + 10% monosodium citrate (w) solution worked as desulfurization-denitration solution (excerpts from May, 6 to 14, 2014)

| | | Time | | | | | | | | |
|---|---|---|---|---|---|---|---|---|---|---|
| | | 22:30 | 13:30 | 13:30 | 13:30 | 13:30 | 13:30 | 13:30 | 23:30 | 21:30 |
| | $T_1$/°C. | 43.6 | 48.8 | 46.2 | 49.4 | 49.1 | 44.5 | 44.7 | 43.4 | 42.6 |
| | $T_2$/°C. | 30.8 | 37.1 | 39.5 | 37.2 | 37 | 35.8 | 37 | 35 | 37.2 |
| | $T_3$/°C. | 33.6 | 37.6 | 40.9 | 38.1 | 37.7 | 38.8 | 37.8 | 37.3 | 41.9 |
| | $T_4$/°C. | 32.5 | 35.8 | 39.6 | 39.2 | 36.2 | 39.3 | 36.7 | 36.5 | 41.6 |
| | $T_5$/°C. | 42.2 | 47.9 | 53.8 | 30.2 | 45.5 | 49.8 | 35.1 | 38.2 | 38.5 |
| | $T_6$/°C. | 88.9 | 81.7 | 89.5 | 81.9 | 86.3 | 91 | 89.3 | 80.9 | 82.1 |
| | $T_7$/°C. | 36.1 | 39.5 | 42.5 | 40.8 | 40 | 39.1 | 38.5 | 37.4 | 41 |
| | $T_8$/°C. | 115.7 | 113.9 | 117.4 | 114.6 | 113.2 | 112 | 111.5 | 100.9 | 101 |
| | $T_9$/°C. | 108.1 | 105.1 | 103.2 | 99.4 | 99.4 | 101.4 | 100.1 | 91.5 | 94.2 |
| | $T_{10}$/°C. | 116.5 | 116 | 115.3 | 114 | 113.4 | 113.4 | 112.8 | 103.7 | 105.6 |
| | $T_{11}$/°C. | 115.9 | 115 | 116.5 | 115.6 | 112.8 | 112.6 | 112.3 | 101.4 | 101.9 |
| | $T_{12}$/°C. | 106.5 | 106 | 105.7 | 104.7 | 104.2 | 103.6 | 103.8 | 92.6 | 92.4 |
| | $T_{13}$/°C. | 114 | 114.3 | 116.3 | 114.9 | 114.8 | 114.4 | 115.5 | 109.1 | 106.1 |
| | $T_{14}$/°C. | 106.9 | 108.2 | 107.6 | 105.5 | 105.7 | 106.9 | 107.1 | 94.2 | 91.6 |
| | $T_{15}$/°C. | 105 | 105 | 104.9 | 103.7 | 103.6 | 103.1 | 103.2 | 92.3 | 92.2 |
| | $T_{16}$/°C. | 44.5 | 44.3 | 36.8 | 41.2 | 36.3 | 36 | 36.4 | 38.6 | 50.1 |
| | $P_1$/kPa | 16 | 17 | 19 | 20 | 17 | 19 | 20 | 20 | 16.85 |
| | $P_2$/kPa | 11 | 10 | 12 | 10 | 10 | 11 | 10 | 10 | 10.9 |
| | $P_3$/kPa | −1 | −2 | 2 | 0 | −3 | −2 | −10 | −30 | −13 |
| | $P_4$/kPa | 26 | 27 | 3 | 30 | 20 | 27 | 30 | 0 | 0 |
| | $P_5$/kPa | −3 | −2 | 3 | 0 | −3 | −2 | 0 | −40 | −36.3 |
| | $F_1$(m$^3$/hr) | 105 | 100 | 105 | 105 | 105 | 115 | 105 | 95 | 105 |
| | $F_2$(l/min) | 15 | 15 | 15 | 15 | 15 | 15 | 15 | 15 | 15 |
| | $F_3$(m$^3$/hr) | 18 | 11.1 | 22.3 | 24.6 | 8.7 | 24.4 | 18.4 | 22.3 | 16 |
| | $F_4$(m$^3$/hr) | 10.2 | 4 | 9.5 | 11.6 | 4.0 | 7 | 10 | 4.5 | 8.8 |
| $A_1$ | SO$_2$(PPm) | 1248.4 | 801 | 1267.6 | 963.4 | 989 | 675.4 | 783.8 | 1053.5 | 1001.9 |
| | NO(PPm) | — | — | — | — | — | — | — | — | — |
| | CO$_2$(V %) | 3.48 | 5.27 | 3.29 | 4.86 | 3.2 | 4.19 | 3.34 | 3.43 | 4.82 |
| | O$_2$(V %) | — | — | — | — | — | — | — | — | — |
| $A_2$ | SO$_2$(PPm) | 1.1 | 1 | 22.9 | 45.2 | 3.8 | 11.4 | 3.7 | 7.1 | 29 |
| | NO(PPm) | — | — | — | — | — | — | — | — | — |
| | CO$_2$(V %) | 3.66 | 5.26 | 3.28 | 4.94 | 3.53 | 4.36 | 3.44 | 3.46 | 5.83 |
| | O$_2$(V %) | — | — | — | — | — | — | — | — | — |
| $A_3$ | SO$_2$(V %) | — | 55.55 | 71.8 | 68.74 | 64.77 | — | 79.74 | 79.98 | — |
| | NO(V %) | — | — | — | — | — | — | — | — | — |
| | CO$_2$(V %) | — | — | — | — | — | — | — | — | — |
| | O$_2$(V %) | — | — | — | — | — | — | — | — | — |
| $A_4$ | SO$_2$(g/l) | 2.10 | 1.744 | 1.47 | 1.5224 | 1.467 | 0.54 | 1.0242 | 1.2233 | 0.91 |
| | NO(g/l) | — | — | — | — | — | — | — | — | — |
| $A_5$ | SO$_2$(g/l) | 0.19 | 0.109 | 0.08 | 0.083 | 0.083 | 0.06 | 0.0415 | 0.1037 | 0.129 |
| | NO(g/l) | — | — | — | — | — | — | — | — | — |
| $A_6$ | SO$_2$(g/l) | 0.0163 | 0.0014 | 0.01 | 0.0108 | 0.0025 | 0.001 | 0.0077 | 0.0019 | 0.0016 |
| | NO(g/l) | — | — | — | — | — | — | — | — | — |

TABLE 2

Operation data for the case where 60% PEG400 (w) + 30% H$_2$O (w) + 10% monosodium citrate (w) solution worked as desulfurization-denitration solution (May 18 to 21, 2014, two sets per day, 3 sets of data on date 21)

| | | \multicolumn{9}{c}{Time} |
|---|---|---|---|---|---|---|---|---|---|---|
| | | 3:30 | 7:30 | 13:30 | 23:30 | 7:30 | 23:30 | 7:30 | 11:30 | 23:30 |
| | $T_1$/°C. | 41.6 | 44.5 | — | 44.7 | 42.6 | 41.2 | 42.4 | 46.9 | 39.7 |
| | $T_2$/°C. | 37.3 | 35.2 | — | 36.5 | 39.1 | 35.9 | 33.1 | 39.7 | 39.7 |
| | $T_3$/°C. | 42 | 38 | — | 40.4 | 43.7 | 39.2 | 34.8 | 41.7 | 41.9 |
| | $T_4$/°C. | 42 | 38.9 | — | 40 | 42.5 | 38.4 | 35.9 | 40.8 | 40.9 |
| | $T_5$/°C. | 44.3 | 32.7 | — | 40.4 | 41.5 | 40.7 | 32.8 | 42.9 | 42.9 |
| | $T_6$/°C. | 54.7 | 50.1 | — | 52.5 | 56.1 | 56 | 45 | 55.3 | 55 |
| | $T_7$/°C. | 42.4 | 39.8 | — | 41.4 | 45 | 39.2 | 38.1 | 41.7 | 41.8 |
| | $T_8$/°C. | 105.5 | 108.9 | — | 116.1 | 113.3 | 112.1 | 113.3 | 113.2 | 110.6 |
| | $T_9$/°C. | 92.1 | 96.1 | — | 101.9 | 101.9 | 101.6 | 101.9 | 99.3 | 140.4 |
| | $T_{10}$/°C. | 101.5 | 110.5 | — | 113 | 113.4 | 113.4 | 113.6 | 112.8 | 111.6 |
| | $T_{11}$/°C. | 105.6 | 1110 | — | 115.6 | 113.8 | 112.6 | 112.6 | 113.3 | 111.1 |
| | $T_{12}$/°C. | 92.6 | 98.7 | — | 103.4 | 102.9 | 102.7 | 102.4 | 102.8 | 101.5 |
| | $T_{13}$/°C. | 106 | 110.4 | — | 118.3 | 117.3 | 111.7 | 111.7 | 114.2 | 110.5 |
| | $T_{14}$/°C. | 91.1 | 90.7 | — | 103.8 | 105.1 | 104.9 | 103.8 | 103.1 | 105.3 |
| | $T_{15}$/°C. | 92.6 | 98.2 | — | 103 | 102.7 | 102.6 | 102.2 | 102.7 | 101.7 |
| | $T_{16}$/°C. | 35.9 | 38.7 | — | 34.3 | 34.3 | 37.7 | 37.5 | 36.8 | 37.9 |
| | $P_1$/kPa | 18.95 | 14.9 | — | 17.15 | 20.4 | 18.7 | 16.4 | 20.4 | 21.2 |
| | $P_2$/kPa | 6.2 | 7.95 | — | 6.65 | 5.7 | 8 | 5.55 | 3.3 | 4.45 |
| | $P_3$/kPa | −28.45 | −19.6 | — | −2.45 | −4.15 | −1.7 | −7.55 | −4.95 | −2.65 |
| | $P_4$/kPa | 4.8 | 2.1 | — | 56.25 | 51.6 | 24.6 | 17.55 | 33.75 | 20.85 |
| | $P_5$/kPa | −31.8 | −21.1 | — | −4.25 | −4.65 | −5.55 | −7.5 | −5.8 | −4.4 |
| | $F_1$(m$^3$/hr) | 80 | 105 | 105 | 105 | 95 | 95 | 105 | 95 | 80 |
| | $F_2$(l/min) | 25 | 20 | 25 | 22 | 22 | 20 | 18 | 22 | 22 |
| | $F_3$(m$^3$/hr) | 16.4 | 17.9 | — | 16.8 | 15 | 15.8 | 1.5 | 14.1 | 24.2 |
| | $F_4$(m$^3$/hr) | 6.3 | 6.7 | — | 6.7 | 5.3 | 4.9 | 0 | 5.1 | 6.9 |
| $A_1$ | SO$_2$(PPm) | 1011 | 1207.5 | 1860 | 910.5 | 975 | 888.1 | 634.4 | 543 | 912 |
| | NO(PPm) | 83 | 95 | 351.8 | 263.5 | 79.5 | 29.8 | 84.3 | 178 | 65.9 |
| | CO$_2$(V %) | 4.275 | 2.89 | 3.67 | 4.4 | 3.6 | 2.35 | 1.96 | 3.5 | 3.36 |
| | O$_2$(V %) | 20.3 | 20.6 | — | — | — | 20.9 | 20.6 | 20.1 | 20.25 |
| $A_2$ | SO$_2$(PPm) | 5.75 | 67.25 | 22.4 | 4.1 | 27.5 | 8.8 | 14.4 | 39.8 | 93.8 |
| | NO(PPm) | 94 | 79.1 | 318 | 219.5 | 54.3 | 11.4 | 29.3 | 145.1 | 27 |
| | CO$_2$(V %) | 4.2 | 2.86 | 4.14 | 4.5 | 3.7 | 2.57 | 1.92 | 3.5 | 3.77 |
| | O$_2$(V %) | 19.9 | 20.4 | — | — | — | 20.5 | 21 | 20.3 | 20.31 |
| $A_3$ | SO$_2$(V %) | — | — | 88.3 | 89.6 | 89.5 | 90 | 90 | 89.6 | 90 |
| | NO(V %) | — | — | — | 0.1 | 0.1 | 0.1 | 0.1 | 0.1 | 0 |
| | CO$_2$(V %) | — | — | 5.1 | 12.6 | 11.6 | 5.35 | 8.2 | 14.1 | 10.4 |
| | O$_2$(V %) | — | — | — | — | — | — | — | — | — |
| $A_4$ | SO$_2$(g/l) | 0.49 | 1.09 | 1.0626 | 0.6531 | 0.49 | 0.5464 | 0.4798 | 0.4265 | 0.3532 |
| | NO(g/l) | — | — | — | — | — | — | — | — | — |
| $A_5$ | SO$_2$(g/l) | 0.11 | 0.0076 | 0.015 | 0.02 | 0.048 | 0.0266 | 0.0267 | 0.0533 | 0.0267 |
| | NO(g/l) | — | — | — | — | — | — | — | — | — |
| $A_6$ | SO$_2$(g/l) | 0.010 | 0.006 | 0.0054 | 0.0014 | 0.001 | 0.0018 | 0.0017 | 0.0012 | 0.0065 |
| | NO(g/l) | — | — | — | — | — | — | — | — | — |

TABLE 3

Operation data for the case where 30% EG (w) + 30% PEG400 (w) + 30% H$_2$O (w) + 10% monosodium citrate (w) solution worked as desulfurization-denitration solution (excerpts from May, 23 to 31, 2014)

| | \multicolumn{9}{c}{Time} |
|---|---|---|---|---|---|---|---|---|---|
| | 7:30 | 9:30 | 9:30 | 21:30 | 19:30 | 9:30 | 9:30 | 7:30 | 7:30 |
| $T_1$/°C. | 40.8 | 54.7 | 56.1 | 54.5 | 57.9 | 56.9 | 57.4 | 54.8 | 55.6 |
| $T_2$/°C. | 27 | 26.3 | 24.4 | 23.7 | 25.2 | 23.5 | 23.2 | 27.3 | 22.3 |
| $T_3$/°C. | 38.5 | 39.7 | 37.6 | 37.1 | 38.1 | 35.1 | 37.2 | 37.3 | 35.1 |
| $T_4$/°C. | 38.3 | 39.1 | 37.2 | 37.1 | 38.6 | 36.8 | 35.2 | 37.5 | 35 |
| $T_5$/°C. | 46.2 | 44.9 | 37.2 | 40.7 | 45 | 34.5 | 31.7 | 39.7 | 37.6 |
| $T_6$/°C. | 60.8 | 54.2 | 46.2 | 55.2 | 53 | 45.1 | 46.9 | 37.4 | 63.7 |
| $T_7$/°C. | 40.8 | 42.4 | 38 | 39.6 | 39.8 | 37.7 | 40.1 | 38.5 | 38.3 |
| $T_8$/°C. | 114.7 | 107.4 | 112.7 | 109.8 | 108 | 109 | 114.1 | 108.1 | 112.1 |
| $T_9$/°C. | 104.1 | 104.7 | 110.7 | 92.8 | 107 | 101.3 | 102.8 | 107.7 | 111.6 |
| $T_{10}$/°C. | 116.2 | 112.9 | 115.8 | 113 | 113.5 | 112.6 | 115.7 | 114.0 | 116.1 |
| $T_{11}$/°C. | 115.6 | 108.5 | 113.2 | 111.1 | 105.7 | 104.8 | 107.6 | 103.3 | 106.7 |
| $T_{12}$/°C. | 104.1 | 99 | 102.3 | 100.2 | 102.3 | 101 | 103.7 | 100.1 | 103 |
| $T_{13}$/°C. | 110.9 | 135.4 | 114.4 | 110.5 | 111.3 | 111.2 | 116 | 111.4 | 112.4 |
| $T_{14}$/°C. | 104 | 100.6 | 105.4 | 101 | 101.6 | 104.7 | 105.7 | 103.9 | 105.1 |
| $T_{15}$/°C. | 103.7 | 99.1 | 100.9 | 100 | 98.2 | 99.8 | 102.9 | 100.1 | 103.1 |
| $T_{16}$/°C. | 36.7 | 43.1 | 39.8 | 37.3 | 40.4 | 38.6 | 39.5 | 38.4 | 37.6 |

TABLE 3-continued

Operation data for the case where 30% EG (w) + 30% PEG400 (w) + 30% H$_2$O (w) + 10% monosodium citrate (w) solution worked as desulfurization-denitration solution (excerpts from May, 23 to 31, 2014)

| | | Time | | | | | | | | |
|---|---|---|---|---|---|---|---|---|---|---|
| | | 7:30 | 9:30 | 9:30 | 21:30 | 19:30 | 9:30 | 9:30 | 7:30 | 7:30 |
| | P$_1$/kPa | 13.75 | 20.2 | 15.65 | 16.2 | 16.85 | 17.15 | 16.25 | 15.9 | 17.8 |
| | P$_2$/kPa | 7.4 | 4.95 | 6.85 | 8.75 | 8.65 | 8.8 | 8.9 | 6.1 | 10.2 |
| | P$_3$/kPa | −1.1 | −10.55 | −4.3 | −8.9 | −3.65 | −9.7 | −0.5 | 6.8 | 0.9 |
| | P$_4$/kPa | 23.1 | 135.15 | 34.05 | 22.5 | 22.95 | 21.45 | 46.2 | 25.8 | 28.95 |
| | P$_5$/kPa | −3.1 | −14.25 | −8.1 | −11.05 | −5.25 | −11.5 | −1.15 | 9.5 | −0.35 |
| | F$_1$(m$^3$/hr) | 110 | 110 | 115 | 115 | 120 | 120 | 120 | 110 | 114 |
| | F$_2$(l/min) | 15 | 18 | 18 | 14 | 15 | 15 | 15 | 15 | 15 |
| | F$_3$(m$^3$/hr) | 17.8 | 23.2 | 18.5 | 20.4 | 19.7 | 21.3 | 24.6 | 25 | 15.6 |
| | F$_4$(m$^3$/hr) | 5.1 | 6.4 | 6.1 | 5.2 | 5.9 | 5.9 | 5.1 | 7 | 4.9 |
| A$_1$ | SO$_2$(PPm) | 1141.5 | 708 | 933 | 528 | 490.5 | 690 | 805.5 | 646.5 | 538.5 |
| | NO(PPm) | 75.8 | 23.3 | 33.5 | 32.8 | 28 | 29.8 | 45 | 35.8 | 21.1 |
| | CO$_2$(V %) | 4.5 | 1.8 | 7.9 | 4.7 | 7.3 | 7.3 | 5.97 | 7.8 | 7.57 |
| | O$_2$(V %) | 20.4 | 18.4 | 20 | 18.6 | 19.9 | 17.2 | 18.425 | 17.8 | 18.8 |
| A$_2$ | SO$_2$(PPm) | 2.1 | 6.6 | 4.6 | 0.4 | 0.1 | 0.1 | 4.4 | 48.8 | 9.5 |
| | NO(PPm) | 28.9 | 3.3 | 8.3 | 5.3 | 1.4 | 10.4 | 16.9 | 3.0 | 12.4 |
| | CO$_2$(V %) | 5.1 | 1.8 | 6.7 | 4.8 | 8.9 | 8.2 | 6.7 | 8.1 | 9.4 |
| | O$_2$(V %) | 20.1 | 18.5 | 18.6 | 18.6 | 16.4 | 17.6 | 18.8 | 18.1 | 19 |
| A$_3$ | SO$_2$(V %) | 89.7 | 83.6 | 89.3 | 56.2 | 43.7 | 72.4 | 80.6 | 64.5 | 82 |
| | NO(V %) | 0.1 | 0.1 | 0.1 | 0.1 | 0 | 0.1 | 0.06 | 0.1 | 0.09 |
| | CO$_2$(V %) | 6.7 | 5.8 | 10.1 | 6 | — | — | — | — | — |
| | O$_2$(V %) | — | — | — | — | — | — | — | — | — |
| A$_4$ | SO$_2$(g/l) | 0.9611 | 1.01 | 1.4776 | 0.6712 | 1.2088 | 1.2217 | 1.5209 | 1.1728 | 0.7552 |
| | NO(g/l) | — | — | — | — | — | — | — | — | — |
| A$_5$ | SO$_2$(g/l) | 0.0163 | 0.1662 | 0.0358 | 0.0358 | 0.044 | 0.068 | 0.0383 | 0.1462 | 0.1114 |
| | NO(g/l) | — | — | — | — | — | — | — | — | — |
| A$_6$ | SO$_2$(g/l) | 0.0009 | 0.0011 | 0.0017 | 0.0016 | 0.0016 | 0.0027 | 0.0010 | 0.0009 | 0.0019 |
| | NO(g/l) | — | — | — | — | — | — | — | — | — |

What is claimed is:

1. A flue gas desulfurization-denitration process, comprising the following procedures:
  1) afterheat recovery procedure: the temperature of the flue gas is lowered to below 50° C. in a heat exchange recovering way, and afterheat recovery is carried out;
  2) desulfurization-denitration procedure: the cooled flue gas enters into an absorption tower, sulfur dioxide and/or nitrogen oxides therein are absorbed by a desulfurization-denitration solution, and the said desulfurization-denitration solution is a composite solution containing polyol and/or polymeric polyol;
  3) regeneration procedure of desulfurization-denitration solution: in a regeneration tower, the desulfurization-denitration solution with absorbed sulfur dioxide and/or nitrogen oxides releases the sulfur dioxide and/or nitrogen oxides by ways of heating and/or gas stripping and/or vacuum regeneration, and the desulfurization-denitration solution after regeneration is recycled for use;
  4) sulfur dioxide and/or nitrogen oxides concentration procedure: in a concentration tower, sulfur dioxide and/or nitrogen oxides released by the regeneration procedure of the desulfurization-denitration solution are concentrated into a product of sulfur dioxide and/or nitrogen oxides with a higher purity.

2. The said flue gas desulfurization-denitration process according to claim 1, characterized in that, a way of direct heat exchange recovery or a way of simultaneous indirect-direct heat exchange recovery is used by the afterheat recovery procedure.

3. The said flue gas desulfurization-denitration process according to claim 2, characterized in that, in the afterheat recovery procedure, the flue gas is brought into direct contact with a heat storage fluid for heat exchange, and the circulation volume of the heat storage fluid is increased by providing one or more stages of internal circulation pumps.

4. The said flue gas desulfurization-denitration process according to claim 1, characterized in that, in the desulfurization-denitration procedure, the circulation volume of the desulfurization-denitration solution is increased by providing one or more stages of internal circulation pumps.

5. The said flue gas desulfurization-denitration process according to claim 1, characterized in that, the regeneration procedure of said desulfurization-denitration solution is specifically as follows: the desulfurization-denitration solution with absorbed sulfur dioxide and/or nitrogen oxides from the flue gas is a desulfurization-denitration rich solution, which is first subjected to indirect heat exchange with a desulfurization-denitration lean solution flowing out of the bottom of the regeneration tower, and is heated to above 90° C., and then enters from the upper end of the regeneration tower to desorb the sulfur dioxide and/or nitrogen oxides by heating and/or gas stripping and/or vacuum regeneration, and turns into the desulfurization-denitration lean solution, which flows out of the bottom of the regeneration tower, is subjected to heat exchange and cooling to below 50° C., and then is sent to the desulfurization-denitration procedure for recycle use.

6. The said flue gas desulfurization-denitration process according to claim 1, characterized in that, the sulfur dioxide and/or nitrogen oxides concentration procedure is specifically as follows: a mixed gas released by the regeneration procedure of desulfurization-denitration solution, which contains sulfur dioxide and/or nitrogen oxides, enters from the middle section of the concentration tower, contacts with the condensed water from the top of the concentration tower in a counter-current way to condense water vapor in the mixed gas, the mixed gas with water vapor removed flows out of the top of the concentration tower; water vapor enters from the bottom end of the concentration tower, contacts with the condensed water in a counter-current way, residual sulfur dioxide and/or nitrogen oxides in the condensed water are extracted by the water vapor, so as to turn the condensed water into distilled water, which flows out of the bottom of the concentration tower and is recycled.

7. A flue gas desulfurization-denitration device, comprising an afterheat recovery tower, an absorption tower, a regeneration tower and a concentration tower, wherein:

The afterheat recovery tower: is used for heat exchange between the flue gas and a heat storage fluid, lowering the temperature of the flue gas to below 50° C., and carrying out afterheat recovery;

The absorption tower: is used for direct contact of the cooled flue gas with a desulfurization-denitration solution, the desulfurization-denitration solution absorbs sulfur dioxide and/or nitrogen oxides in the flue gas and turns into a desulfurization-denitration rich solution, and then is discharged from the absorption tower; the said desulfurization-denitration solution is a composite solution containing polyol and/or polymeric polyol;

The regeneration tower: is used for the desulfurization-denitration rich solution to desorb sulfur dioxide and/or nitrogen oxides by heating and/or gas stripping and/or vacuum regeneration and turn into a desulfurization-denitration lean solution, the desulfurization-denitration lean solution obtained by regeneration is sent back to the absorption tower for recycle use;

The concentration tower: is used for removing, by condensation, water vapor from a mixed gas comprising sulfur dioxide and/or nitrogen oxides, which is released from the regeneration tower, sulfur dioxide and/or nitrogen oxides are condensed into a product of sulfur dioxide and/or nitrogen oxides with a higher purity.

8. The said flue gas desulfurization-denitration device according to claim 7, characterized in that, the said afterheat recovery tower is provided with one or more stages of internal circulation pumps for increasing the circulation volume of the heat storage fluid.

9. The said flue gas desulfurization-denitration device according to claim 7, characterized in that, the said absorption tower is provided with one or more stages of internal circulation pumps for increasing the circulation volume of the desulfurization-denitration solution.

10. The said flue gas desulfurization-denitration device according to claim 7, characterized in that, a heat exchanger is provided between the said absorption tower and the regeneration tower, and the desulfurization-denitration rich solution from the absorption tower and the desulfurization-denitration lean solution flowing out of the regeneration tower are subjected to indirect heat exchange through the heat exchanger.

* * * * *